United States Patent
Knight et al.

(10) Patent No.: US 9,405,038 B2
(45) Date of Patent: Aug. 2, 2016

(54) FIBER OPTIC VAULT SECURITY SYSTEM

(71) Applicants: Philip A. Knight, Greer, SC (US); R Josh Hanlin, Simpsonville, SC (US)

(72) Inventors: Philip A. Knight, Greer, SC (US); R Josh Hanlin, Simpsonville, SC (US)

(*) Notice: Subject to any disclaimer, the term of this patent is extended or adjusted under 35 U.S.C. 154(b) by 0 days.

(21) Appl. No.: 14/539,144

(22) Filed: Nov. 12, 2014

(65) Prior Publication Data

US 2015/0254949 A1 Sep. 10, 2015

Related U.S. Application Data

(60) Provisional application No. 61/948,935, filed on Mar. 6, 2014.

(51) Int. Cl.

| G08B 13/18 | (2006.01) |
|---|---|
| G01V 8/16 | (2006.01) |
| B65B 25/02 | (2006.01) |
| G08B 13/186 | (2006.01) |
| G08B 13/12 | (2006.01) |
| G01J 1/04 | (2006.01) |
| G08B 13/14 | (2006.01) |
| E05G 1/024 | (2006.01) |

(52) U.S. Cl.
CPC . *G01V 8/16* (2013.01); *B65B 25/02* (2013.01); *G01J 1/0425* (2013.01); *G08B 13/124* (2013.01); *G08B 13/126* (2013.01); *G08B 13/1463* (2013.01); *G08B 13/186* (2013.01); *E05G 1/024* (2013.01)

(58) Field of Classification Search
CPC .. G08B 13/124; G08B 13/183; G08B 13/186; B65D 25/02; G01J 1/0425
USPC ........ 340/556, 550, 555; 250/227.14, 227.15; 109/78–82
See application file for complete search history.

(56) References Cited

U.S. PATENT DOCUMENTS

| 4,234,875 | A | * | 11/1980 | Williams | G08B 13/126 109/41 |
|---|---|---|---|---|---|
| 4,367,460 | A | * | 1/1983 | Hodara | G08B 13/126 250/215 |
| 4,867,820 | A | * | 9/1989 | Jacobson | G08B 13/126 156/101 |
| 5,325,084 | A | * | 6/1994 | Timm | E05G 5/003 109/68 |
| 5,987,941 | A | * | 11/1999 | Zocco | A47B 81/005 109/59 R |
| 6,044,776 | A | * | 4/2000 | Alizade | E05G 1/024 109/78 |
| 6,266,930 | B1 | * | 7/2001 | Kitabatake | E05B 73/00 109/51 |
| 6,556,138 | B1 | * | 4/2003 | Sliva | G08B 13/126 340/545.6 |
| 6,995,353 | B2 | * | 2/2006 | Beinhocker | G08B 13/126 250/227.14 |
| 7,098,444 | B2 | * | 8/2006 | Beinhocker | G08B 13/126 250/227.14 |
| 7,271,723 | B2 | * | 9/2007 | Ando | G08B 13/186 340/545.6 |
| 8,344,885 | B2 | | 1/2013 | Smith | |

(Continued)

*Primary Examiner* — John A Tweel, Jr.
(74) *Attorney, Agent, or Firm* — Southeast IP Group, LLC; Thomas L. Moses

(57) ABSTRACT

An enclosed security system includes a metal cage with security panel affixed thereto, forming a vault in which an item of value is enclosed. The security panels include a series of fiber optic security cables, preferably arranged in a sinusoidal pattern with nested fiber loops for added security. The cage preferably includes the security panels on the sides, front, top and door to form the vault enclosure. Fiber optical sensor cables are routed through the tubular frame members to a control box. An optical security tether may optionally be connected between the control box and a protected asset. The tether preferably comprises a jacketed fiber optic cable with internal strength member, surrounded by a metallic armored flex sheath. Any breakage or disconnection of the fiber optic cables within the panels or tether from the control box is detected by the monitor, causing an alert signal.

19 Claims, 22 Drawing Sheets

FIG. —4—

(56) References Cited

U.S. PATENT DOCUMENTS

| | | | |
|---|---|---|---|
| 8,917,177 B2* | 12/2014 | Smith | B65D 25/02 340/10.2 |
| 2008/0092471 A1* | 4/2008 | Ahmad | E04H 9/10 52/322 |
| 2008/0252084 A1 | 10/2008 | Francis et al. | |
| 2010/0141424 A1 | 6/2010 | Calahorra et al. | |
| 2011/0249252 A1 | 10/2011 | Lantz et al. | |
| 2012/0119910 A1 | 5/2012 | Belden, Jr. et al. | |
| 2012/0268103 A1 | 10/2012 | Henson et al. | |

* cited by examiner

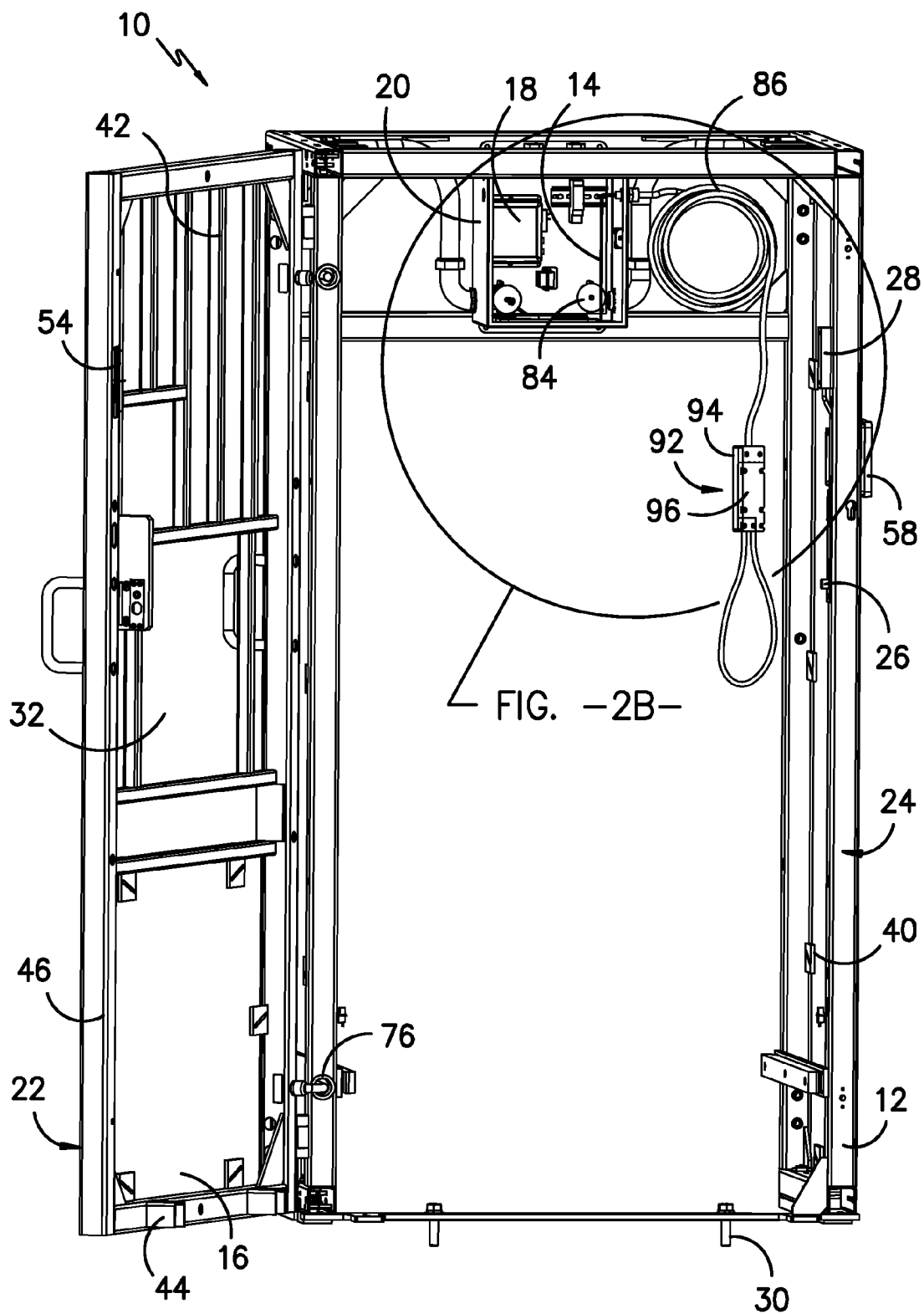
FIG. -2A-

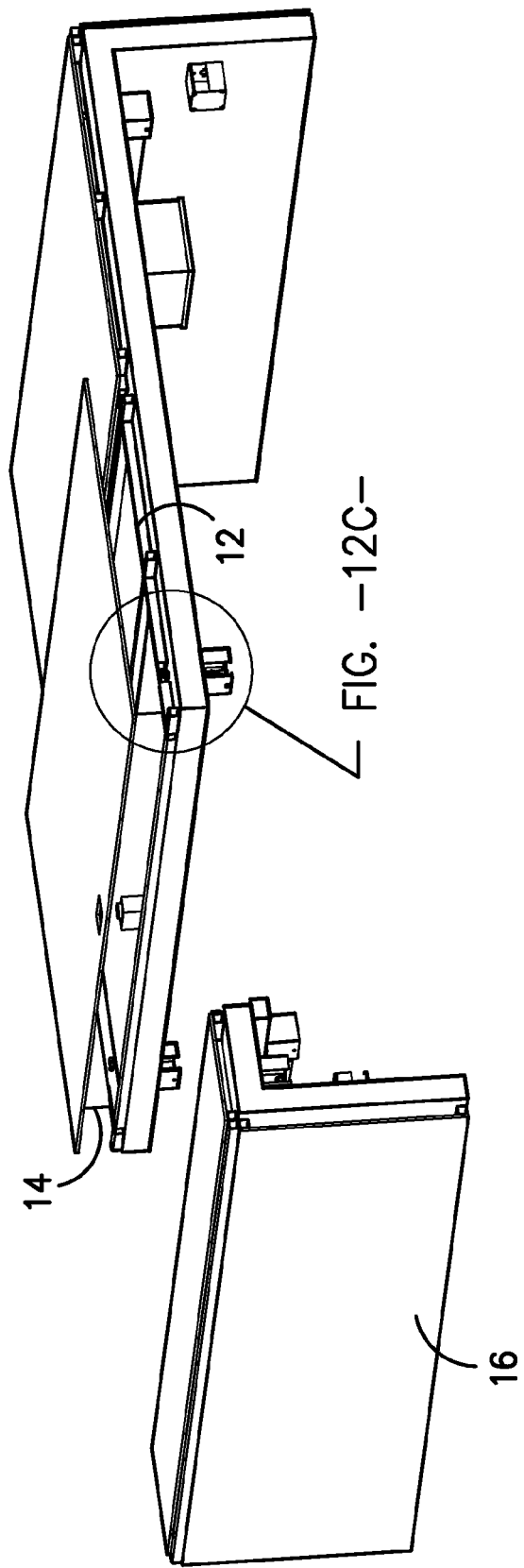

FIBER OPTIC VAULT SECURITY SYSTEM

BACKGROUND OF THE INVENTION

The present invention generally relates to enclosed vault security systems, similar to safes, wherein items of value may be stored and protected against access by unauthorized personnel. More specifically, the present invention includes an enclosure or vault having a series of panels and at least one door, wherein each panel and the door include an embedded fiber optic line arranged either in a random configuration or in a pattern, such that any cut or tight bend in the fiber optic line results in an alarm signal, or other desired alarm output. The present invention has a particularly useful application with respect to blood irradiators, which are found in many hospitals and contain nuclear material that must be protected against theft.

Other types of secured enclosures have been developed heretofore. For example, U.S. Pat. No. 8,344,885 discloses a large shipping container with side panels of a composite material having a security element embedded in the panels, such as an optical cable or electrical cable. The security element is embedded in the panels in a serpentine pattern throughout the entire panels joined together. A monitor includes a light beam and a photo detector or any equivalents. If the side panel is breached, the breach will be sensed by the security element and the monitor will detect the breach.

Published Application US2011/0249252 discloses a sensing device including a first layer, a second layer, and an optical sensor. The first layer includes a flat surface for supporting an associated load that transmits a strain to the second layer. The second layer is formed of a compliant material and provides a uniform support for the first layer. The second layer deflects due to the associated load on the first layer and the optical sensor, positioned between the first and second layer, senses the strain due to the associated load. The sensing device may be used in various technologies that detect, or attempt to detect, the undesired, unlawful, or hazardous presence of persons, objects, or vehicles.

Published Application US2010/0141424 discloses an anti-theft device for solar panels having at least one optical cable which is made to pass through the solar panels. At the ends of the cable, an electrical control circuit is connected capable of detecting a cut in the cable caused by interruption of the light beam in the fiber or voltage drop at the ends of the electrical cable. Cutting of the cable is detected by the control circuit which activates an alarm, acoustic, or visual signal.

Published Application US2008/0252084 discloses a shipping container having a tracking and seal monitoring system. The seal device includes a first unit affixed to the shipping container and a control system contained in the first unit. A second unit is configured to engage with an element of a shipping container door. The control system is configured to detect a breach of the second unit indicative of access being made to the shipping container.

Published Application US2012/0119910 describes a security system for displaying merchandise in a cabinet wherein the merchandise is tethered to an alarm unit which generates an alarm when one of the items is moved a predetermined distance from the display cabinet.

Published Application US2012/0268103 discloses a security system to prevent removal of handheld electronic devices, such as cell phones, sold to consumers in a retail location. The electronic device is held on a display panel permanently. The panel is attached to a wire wound around a mechanical retractor. The phone and display panel may be lifted and the cable may be extended to allow better inspection of the phone. If an attempt is made to remove the phone from the display panel, a security sensor transmits a signal to a remote location through the wire, which acts as a wireless antenna.

Each of the references set forth above are hereby incorporated herein by reference.

None of the prior art, however, shows a modular security vault having the combination of panels composed of plastic, laminated together with a fiber optic line running in series throughout, wherein the panels are fastened to a metal frame, and which further include a hinged door having the fiber optic cable embedded therein.

SUMMARY OF THE INVENTION

The enclosed vault security system includes a metal cage with security panels affixed thereto, forming a vault in which an item of value, such as a blood irradiator machine, is enclosed. The security panels are formed of a first substrate on which a fiber optic security cable is laid on the substrate, preferably in a sinusoidal pattern with nested fiber loops for added security. Adhesive tape may be used to hold the fiber cable in place, while a second sheet of laminate is adhered to the other side so that the optic cable is sandwiched between the substrates to complete a single security panel. The cage includes the security panels on the sides, front, and possibly the top to form the vault enclosure. A front door includes an opening giving access to the irradiator control panel and other operative features when closed. However, the opening does not permit access or removal of the Cesium (or other nuclear material) contained within the irradiator machine. Fiber optical sensor cables are connected to each security panel at one end, and the cables are then routed through the tubular frame members to a control box. In one embodiment, the fiber optic cables in each security panel are routed individually to the control box. The security panel cannot be removed from the frame without breaking the optical cable. A monitor or light processor is connected to the system, and is used to detect the light passing through the fiber optic cable. Any absence or significant reduction of light is detected by the light processor, which generates a signal that an attempt at unauthorized access has occurred.

In an alternate embodiment, a mobile irradiator machine is kept inside a cabinet, which includes a front door providing access to the irradiator. Because the irradiator is routinely moved in and out of the cabinet for use, an optical security tether is connected between the control box and the irradiator. Any attempt to move the irradiator beyond the room is detected because the tether will break or become disconnected. The tether consist of a jacketed fiber optic cable with internal strength member, such as a Kevlar strand, surrounded by a metallic armored flex sheath. Any breakage or disconnection of the tether from the control box creates an absence of light, which is detected by the monitor, causing an alert signal.

BRIEF DESCRIPTION OF THE DRAWINGS

These and other features, aspects, and advantages of the present invention will become better understood with regard to the following description, appended claims, and accompanying drawings where:

FIG. 2A is a front perspective view of one embodiment of a fiber optic vault security system, further including a tether assembly;

FIG. 12B is a top perspective, exploded view the embodiment shown in FIG. 12A, further showing one embodiment of a loop anchor assembly.

DETAILED DESCRIPTION OF THE INVENTION

Overview

Figure 1:
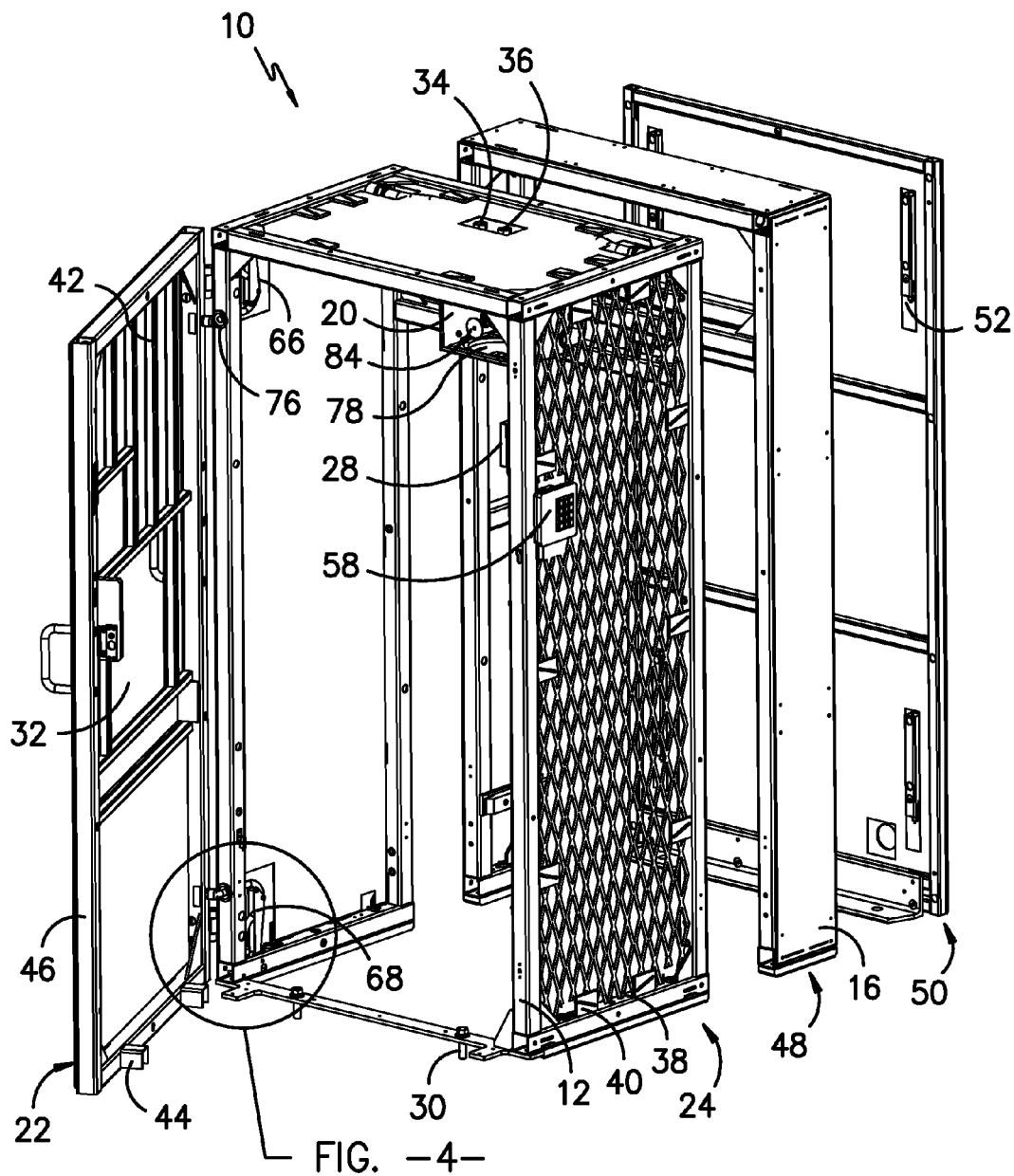
FIG. 1 is a perspective, exploded view of one embodiment of a fiber optic vault security system, including a primary cage with a door, an extension member and a back panel.

Several embodiments of an enclosed security system are shown in FIGS. 1, 2A, 5A, 7A, 11A. In a first embodiment, the enclosed security system 10 (also referred to herein as a "booth," "vault," or "cage") preferably includes a 4-sided cage structure 24 (having no bottom or rear panel in some embodiments) that can be shipped fully assembled and ready for installation on site. The cage frame 12 is preferably fabricated from ERW structural steel tubing and each exterior surface of the cage is covered with a laminated sheet containing fine-diameter fiber optic cable 14. The fiber panels 16 are monitored by a light source/receiver processor ("light processor") 18 installed within an enclosure 20 that is mounted inside the security cage. It is contemplated that a bottom and/or rear panel may be incorporated into the present device, if desired, and other suitable materials may be used for the frame or cage structure, such as aluminum, fiberglass, or the like.

The door 22 of the cage 24 may be equipped with an electric strike 26 (such as Seco-Larm Model SD-997AQ Fail Secure Electric Deadbolt) that serves as a latching mechanism for the door 22 and as a safeguard intrusion protection device in the event of electrical power loss. A balanced magnetic switch 28 (such as Honeywell 968XTP) is mounted near the door closure to monitor the closed condition of the door 22.

Cameras may be mounted inside the cage 24, and a mounting platform may be included to allow attachment of a security access device. The cameras may be operatively connected to a monitor, a recording device (such as a tape, a hard drive, a DVD, or the like), or some combination thereof. The cage 24 may be equipped with floor anchoring means 30, such as bolts, that secure it to the floor as well as prevent it from being lifted away from the floor or moved from its anchored position without detection.

The enclosed security system 10 is designed to provide secure storage of sensitive assets, and is particularly useful for use with blood irradiation machines (or "irradiators") as well as high dose radiation units known as HDRs. Irradiator cages or vaults 24 are designed with pass-through openings 32 in the front door 22 to allow loading and unloading of specimens as well as operator control of the unit without having to activate the access control system.

Figure 11A:
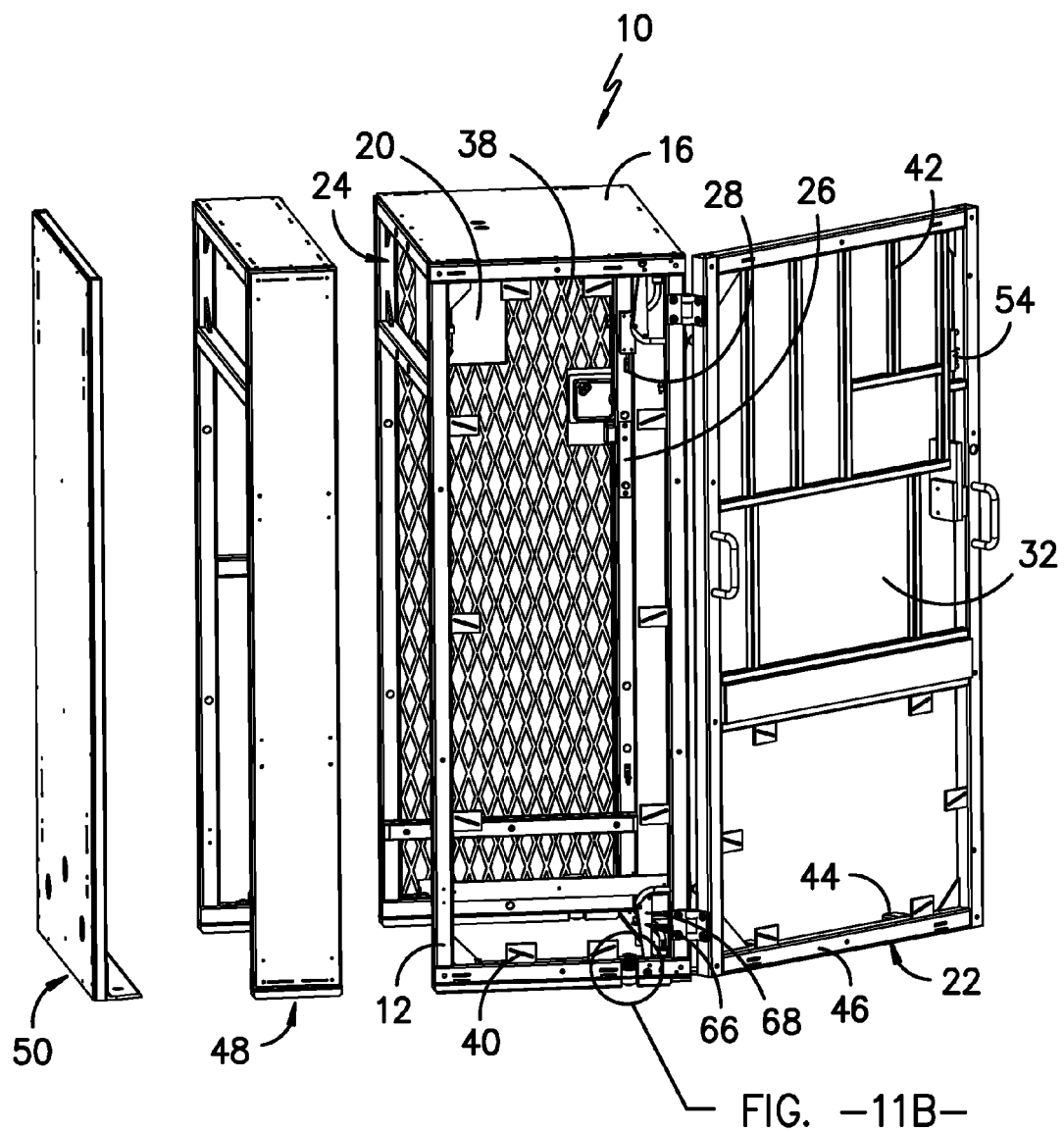
FIG. 11A is a side perspective, exploded view of one embodiment of a fiber optic vault security system, including a primary cage with a door, an extension member and a back panel.
Figure 11B:
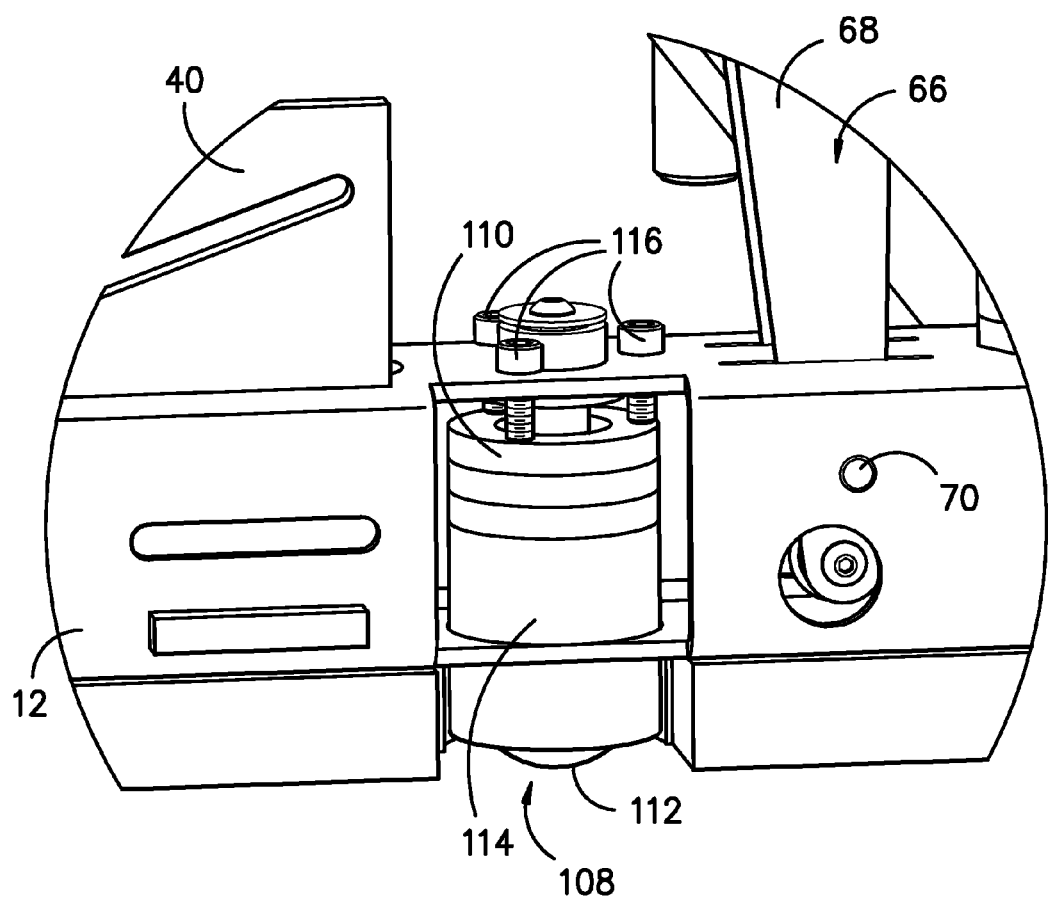
FIG. 11B is a side perspective view of a one embodiment of a wheel assembly attached to the bottom portion of the cage frame, taken from the inset portion of FIG. 11A.

In one embodiment, the security cages 24 are designed to be "close-fit" around the irradiator to minimize the required space requirements. These cages 24 are also designed to be rolled or slid away from the irradiator to allow access to the unit for authorized servicing and inspection. In this mobile embodiment, wheels or rollers 108 may be attached to the bottom portion of the frame 12, as shown in FIG. 11A. In a preferred embodiment, the roller 108 comprises a ball transfer assembly 110, which consists of a roller ball 112 within a casing 114, where the roller ball 112 is in contact with smaller ball bearings (or rolling elements, not shown) positioned within the casing 114, which allows the roller ball 112 to rotate in any direction, as desired. The ball transfer assembly 110 may include means for height adjustment, such as the three jack screws 116 that are disposed through a surface of the bottom frame member 12 and may be used to force the assembly downwardly, as necessary. Other embodiments may include larger vaults, which can provide additional storage space for other valuable assets, or accessories to a protected asset.

In another embodiment, the security cages 24 can be constructed large enough to accommodate service access to the protected asset any time the cage door 22 is opened in an authorized manner. In this embodiment, the cage 24 remains stationary.

The security vault 24 provides immediate detection and alarm signal transmission if the fiber panel 16 skin is penetrated or removed or if the door 22 is forced open in an unauthorized manner. The light processor 18 within the vault 24 converts any disruption of the integrated fiber circuit 14 that guards the protected items into the operation of a set of dry contacts that can be configured as either normally open or normally closed, which can be used to trigger any type of desired alarm.

The vault 24 can be powered by either 120 VAC or 12-24 VDC as selected by the site. Typically, power enters the vault 24 though a provided input portal 34, and the alarm signal leaves the vault through a separate output portal 36, which may be operatively connected to a remote alarm system. The power and signal conduits for the vault 24 are both flexible so that the unit can be moved as needed for irradiator access.

Conceptually, the goal is to provide a secure cage 24 or vault that prevents unauthorized physical access to the irradiator, or other sensitive or valuable assets, by providing not only a physical barrier, in the form of a cage 24 or vault, but also by an electronic, or light, barrier to sound an alarm in the event of an unauthorized breach event. The provision of a light barrier is accomplished by providing paneling 16 having thin fiber optic cable 14 embedded therein, which enwraps the entire cage 24, including the door 22. The fiber optic cable 14 essentially circulates light about the cage 24, and any disruption in the light, due to a bending or breaking of the fiber optic cable 14, triggers an alarm.

The Cage

In a preferred embodiment, the enclosed security system includes a cage 24, which comprises a frame 12 made from structural steel, and sections of expanded metal 38 extending between the frame members 12 to form a first physical barrier (although in some cases, the expanded metal sections may not be necessary). Mounting tabs 40 may be affixed to the frame members 12 in order to receive the expanded metal sections 38, as shown in FIG. 1.

As an alternative to the expanded metal screens 38, for example, closely-spaced metal bars 42 can be used, particularly for a door 22. Maximum bar spacing to prevent access is typically 6 inches, although the spacing may be selected as desired. Metal bars 42 in conjunction with optically clear panels 16 can be used wherever it is desired to provide clear sight through the fiber panels 16 while maintaining the security of the fiber system. In such a case, it is desirable to arrange the fiber optic lines 14 within the clear panel 16 so that they correspond or line up with the metal bars 42 adjacent the clear portions of the panel 16. In some cases, only portions of the panel 16 should be optically clear, for viewing purposes. For the rest of the vault 24, it is preferred that the panels 16 be opaque, and more particularly, black in color.

The frame members 12 preferably have a square cross-section, and are preferably hollow, so that fiber optic cables 14 may be contained therein. In one embodiment, it is contemplated that no floor panels or rear panels are necessary, as the cage 24 may be situated on a thick concrete floor, or the like, and backed up to a secure wall. In these cases, the floor and wall provide the necessary security and protection against unauthorized access from those directions. It is contemplated, however, that floor panels and rear panels may be utilized, as necessary, and are formed similarly to the other side panels described herein, possibly with additional structural support for the floor panels, as determined by the weight requirements of the assets to be stored therein.

Figure 7A:
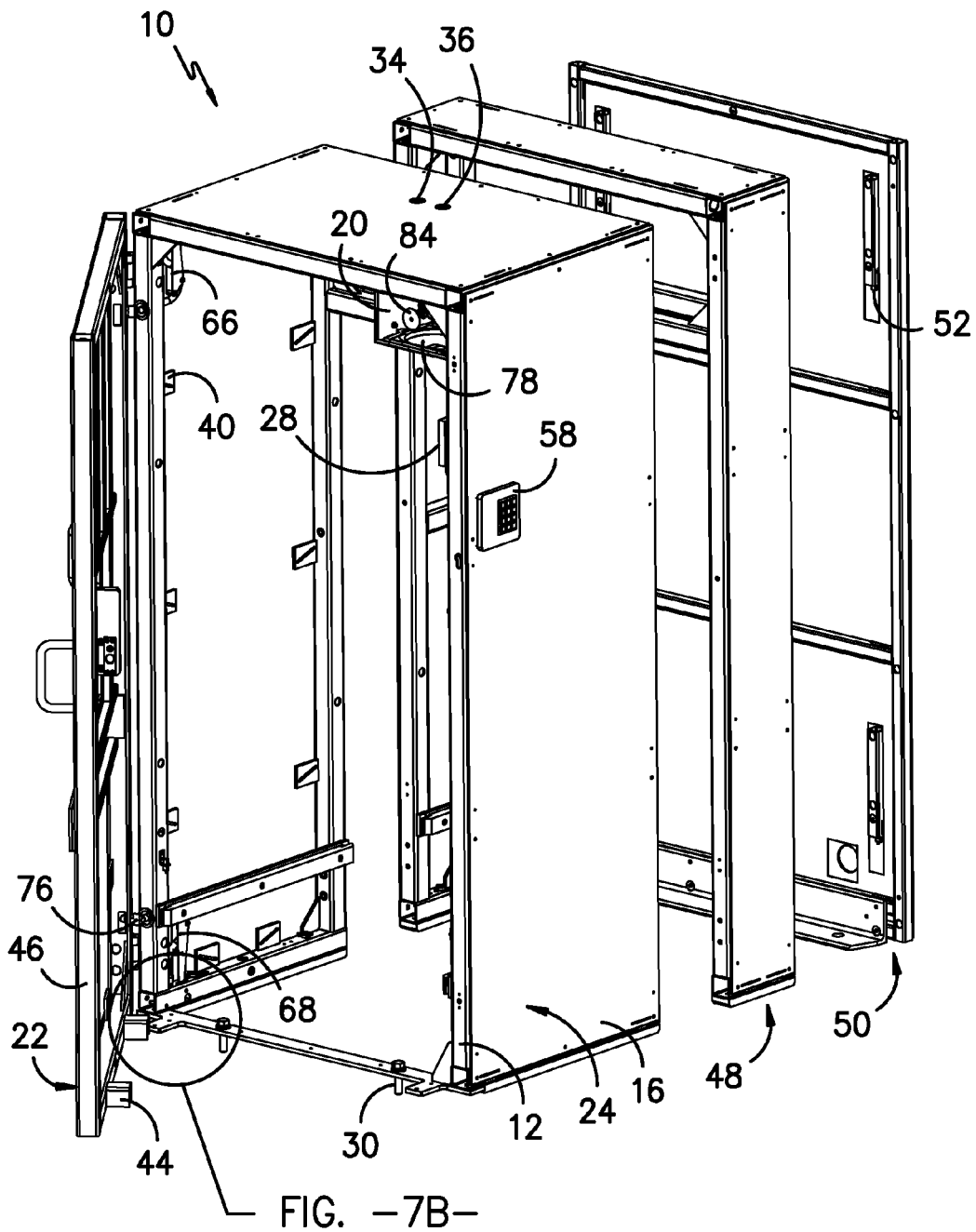
FIG. 7A is a perspective view of one embodiment of a secure anchor system for the cage in which the anchor points are positioned within the cage envelope and the cage door itself cover and protects access to the anchor hardware.
Figure 7B:
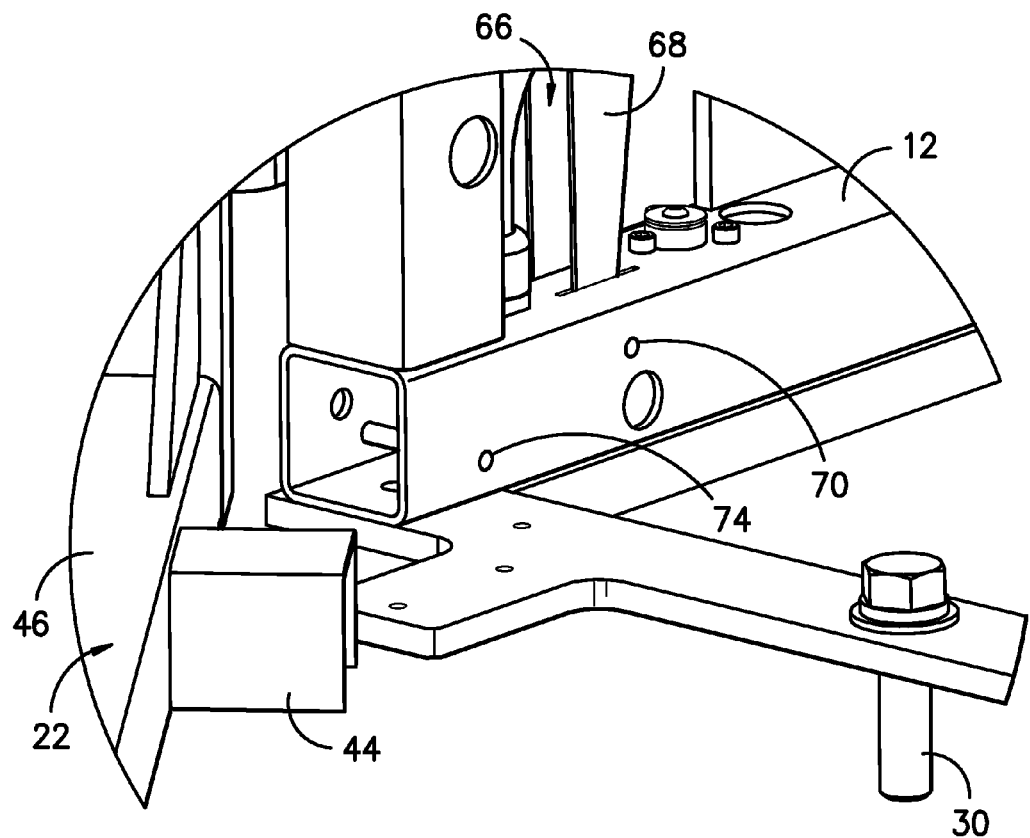
FIG. 7B is a perspective view of one embodiment of a secure anchor system for the cage in which the anchor points are positioned within the cage envelope and the cage door itself cover and protects access to the anchor hardware, taken from the inset portion of FIG. 7A.

Means for securing the cage structure to the floor, such as lag bolts 30 or any other suitable means, may be utilized, and such means are affixed from the inside of the cage 24, preferably through the frame member 12 and into the floor. In one embodiment, the floor anchoring means 30 includes threaded anchors that are embedded into the concrete or flooring beneath the vault, as shown in FIGS. 2A, 5A, 7A, and 7B. Anchor bolts 30 extend through holes in the bottom frame member 12 on the inside of the vault, preferably in the doorway. In this embodiment, cover guards 44 may be welded to the bottom frame 12 of the door 22, in order to conceal the anchor bolts 30 when the door 22 is closed, as shown in FIG. 7. This arrangement prevents unauthorized access to the floor-securing means, because a person must have authorized access to the inside of the cage 24 or vault in order to access such floor securing means.

Figure 4:
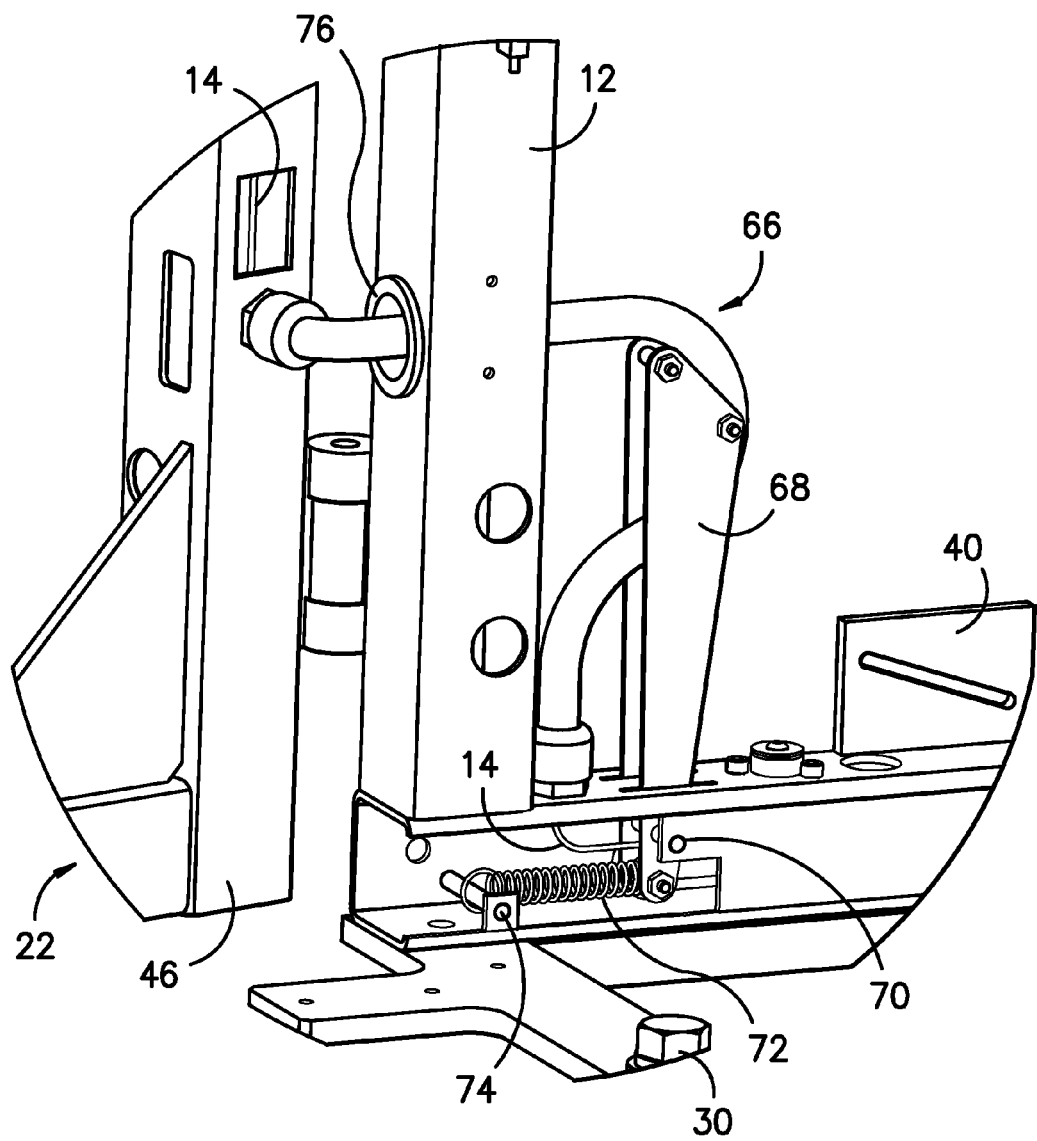
FIG. 4 is a perspective view of one embodiment of a fiber hinge system that maintains a consistent fiber path length and bend radius as the fiber passes from a fixed cage into a movable door.

A hinged door 22 may be affixed to the front portion of the cage, and the door frame 46 may include mounts or hinges on both sides, so that the door may be mounted to swing in either direction, as desired. The door 22 also preferably includes hollow frame members 12, as described above, optionally together with expanded metal sections 38 extending therebetween. In the case of irradiator vaults, an access area 32 may be incorporated into the door 22 to provide access to the irradiator controls, as well as the loading and unloading of specimens. This arrangement allows medical personnel the ability to use the irradiator while the irradiator remains secured within the cage 24. The frame 46 of the door 22 may define a hole adjacent the hinged portion thereof, for receiving fiber optic lines 14 from the cage 24. Similarly, the fixed frame member 12 of the cage 24 may define a corresponding hole, through which a fiber optic cable 14 may extend. This arrangement allows the fiber optic cable 14 to run from the interior of the fixed frame 12 to the interior of the door frame 46, as shown in FIG. 4.

In one embodiment, the cage 24 may be constructed in modular form, as shown in FIG. 1, wherein a primary cage includes a three-sided frame 12 comprising two sides and a ceiling, together with a hinged door 22 affixed to a front portion thereof. Additionally, an extension member 48 may be affixed to the rear portion of the primary cage 24, wherein the extension member 48 also includes two sides and a ceiling. In this embodiment, it is contemplated that a floor is not necessary, as the entire vault 24 may be positioned on a secure floor, although floor components may be used, as necessary. The extension member 48 may have any desired depth (front-to-rear), while it is contemplated that the height and width of the extension member 48 preferably correlate with the height and width of the primary cage 24. This arrangement allows the vault 24 to be lengthened to any desired depth, in order to accommodate any desired asset therein (such as particularly large irradiators, or the like). Further, this modular arrangement allows a large vault 24 to be constructed in a location having a restrictive door width or size. In other words, sections of the vault 24 may be moved through a small door and assembled on the other side thereof. Any suitable means may be used to secure the extension member 48 to the primary cage, including bolts or screws that affix the frame members of each component together within the inside of the vault 24.

In this extended embodiment, corresponding holes may be defined within the abutting frame members of the primary cage 24 and the extension member 48, so that fiber optic cables 14 may run therethrough in a continuous manner, may be operatively connected from one cage section to another, or may be run in any desired manner to form a complete circuit.

A stationary back panel 50 may be mounted to the floor or wall in close proximity to the rear frame of the extension member. Exterior fiber optic cables 14 can then be operatively connected between fiber exit points on the back panel 50 and corresponding connection points on the main cage frame 12. In this embodiment, the fiber connections 52 between the stationary back panel 50 and the moveable security cage 24 must be disconnected before the cage 24 can be moved away from the protected asset. The back panel 50 and the extension member 48 are preferably constructed similarly to the primary cage member 24, so that each includes a hollow metal frame 12 with expanded metal 38 extending therebetween, forming physical barriers against entry through gaps in the frames 12. It is noted, however, that not all embodiments may require the use of expanded metal panels 38 attached to the frame members 12, and the enclosed security vault system 10 may operate properly without the expanded metal panel components 38.

The door 22 of the cage 24 may be equipped with an electric strike 26 that serves as a latching mechanism for the door 22 and as a safeguard intrusion protection device in the event of electrical power loss. Cameras may be mounted inside the cage 24, as well, and a mounting platform may be included to allow attachment of a security access device.

Figure 5A:
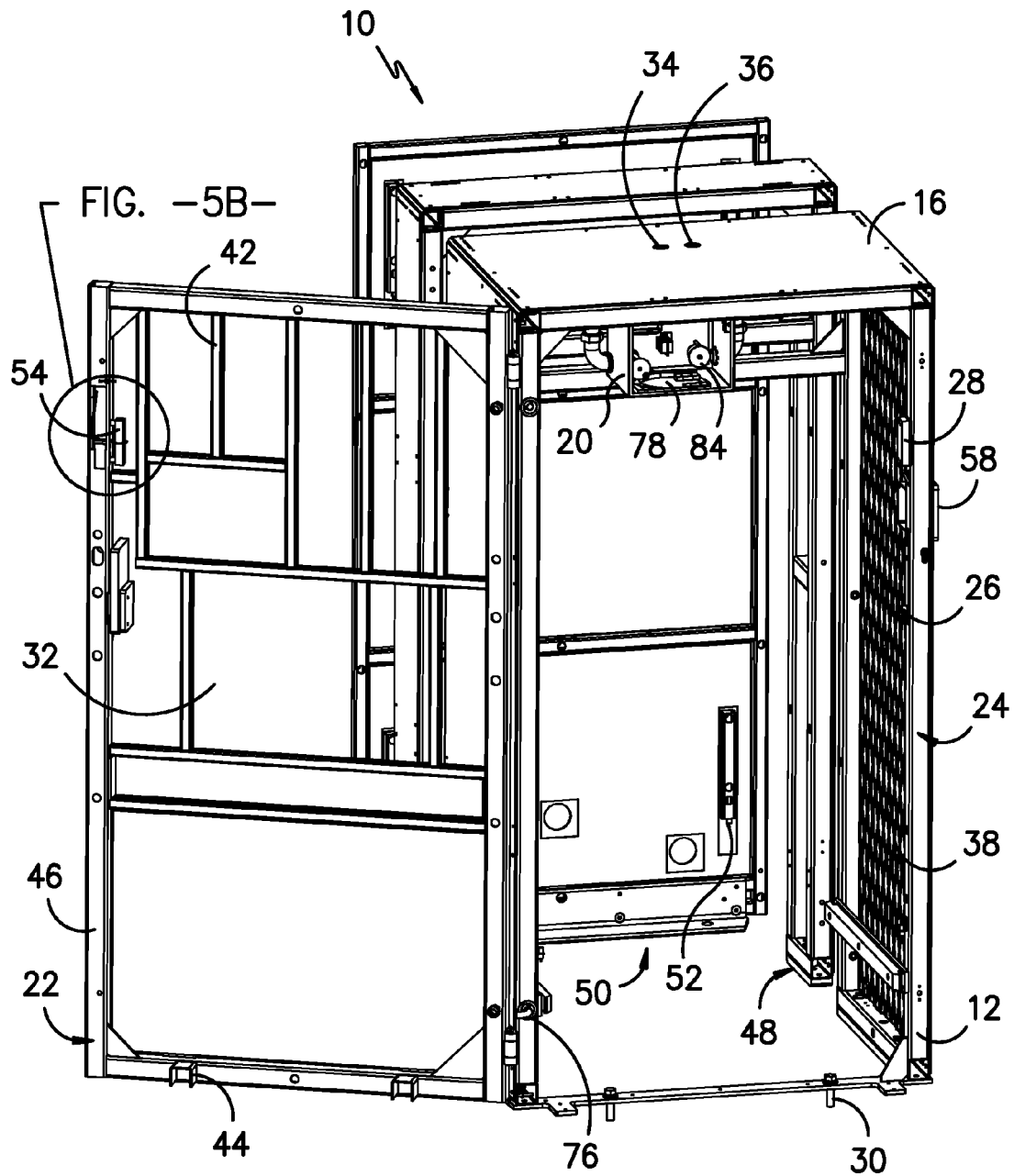
FIG. 5A is a perspective, exploded view of one embodiment of a fiber optic vault security system, including a primary cage with a door, an extension member and a back panel.
Figure 5B:
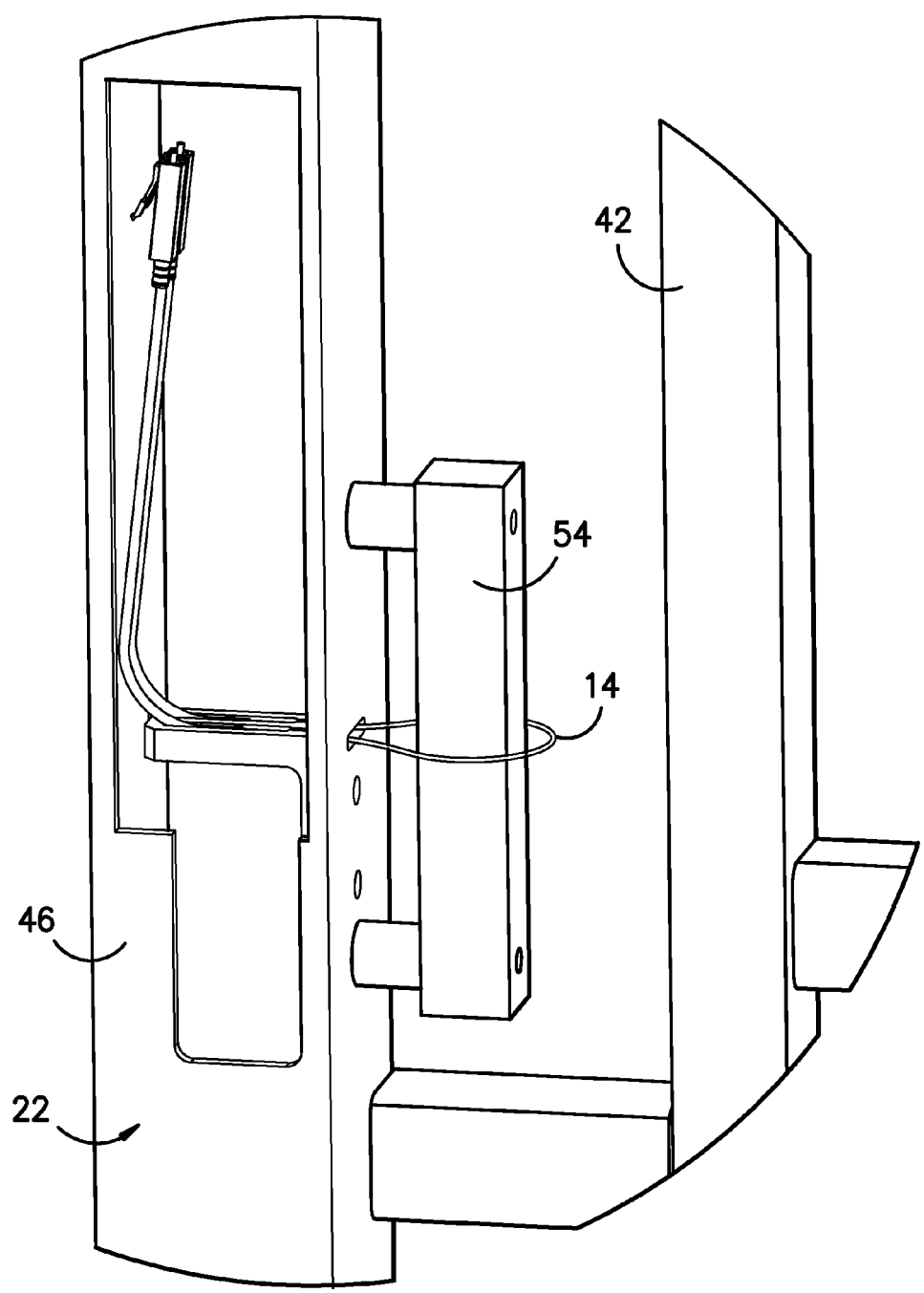
FIG. 5B is a perspective view of one embodiment of a protective fiber tamper loop that is used to secure the proper operation of a balanced magnetic switch application in which there is unrestricted access to both the sensor and target elements of the switch, taken from the inset portion of FIG. 5A.

A balanced magnetic switch 28 may be mounted near the door closure to monitor the closed condition of the door 22, as shown in FIG. 5. In a preferred embodiment, a balanced magnetic switch target 54 is mounted to the door frame 46 using plastic standoffs to provide a space between the magnetic switch target 54 and the door frame 46. A fiber optic line 14, preferably a 900 micron fiber line, is fed from the door frame 46 through a hole between the plastic standoffs, as shown, and the fiber optic line 14 loops around the magnetic switch target 54, and then runs back into the door frame 46. A magnetic switch 28 functions by maintaining a consistent magnetic field between a sensor and target 54. If the spacial relationship changes between the sensor and the target 54, detection is made. Attempts to thwart such a system have included detaching the target 54 from the door to maintain spacial relationship between the target and the sensor, allowing the door 22 to be opened undetected. Providing a fiber optic line 14 in a tight configuration around the target 54, as shown, prevents this method of unauthorized access. This arrangement prevents any undetected tampering with the magnetic switch 28.

Additionally, the door 22 may be equipped with a suitable locking device 56, for security purposes. One particularly advantageous type of lock 56 is an electric deadbolt with a manual override. An access reader 58 may also be incorporated into the design, so that in order to gain access, a person must swipe a magnetized identification or security card. Alternatively, the access reader 58 may scan a person's fingerprints, retina, or other biometric features. Any suitable access reader may be employed, including access readers that may detect multiple factors in combination as a barrier to entry.

Figure 12A:
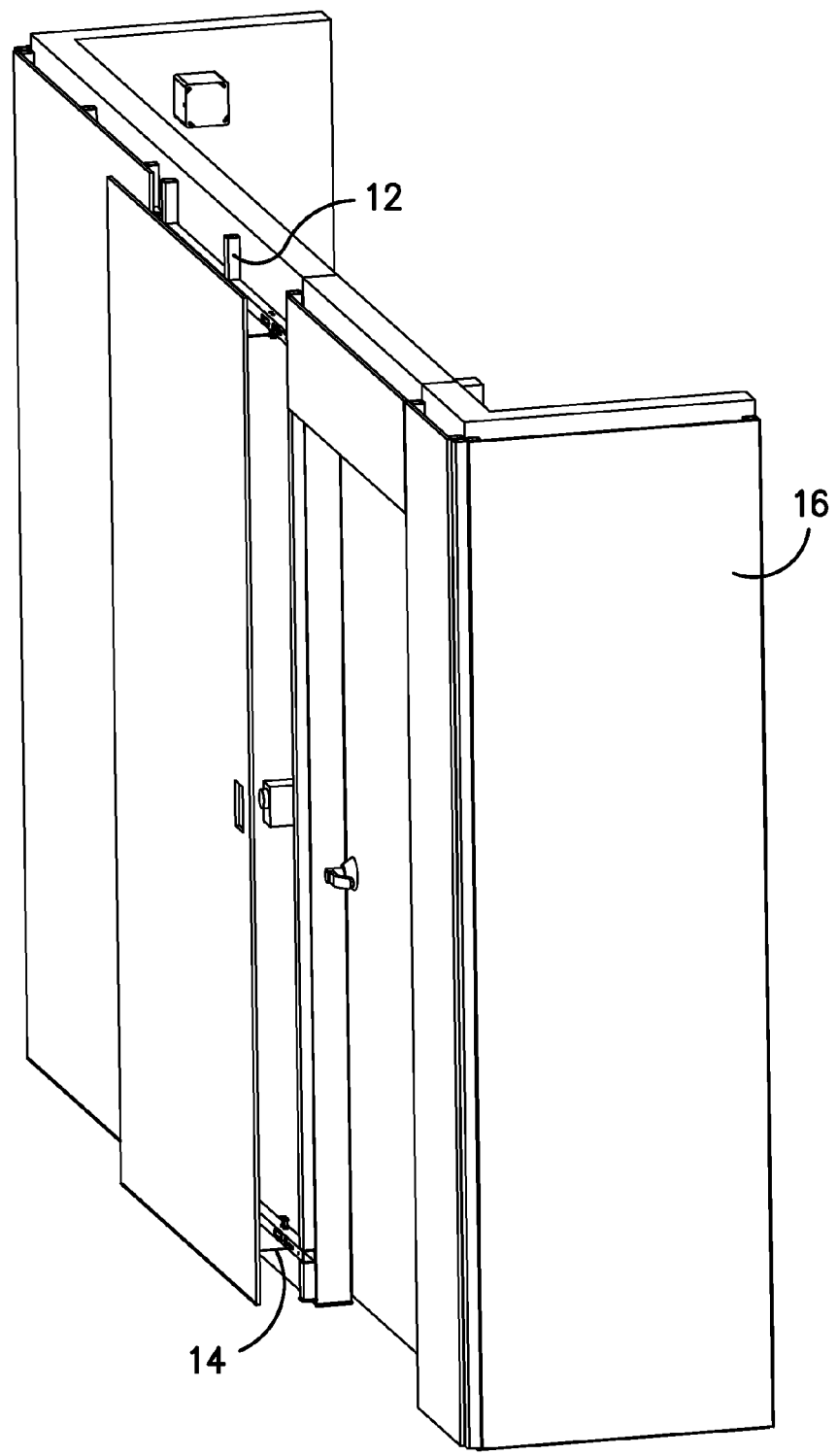
FIG. 12A is a perspective, exploded view of one embodiment fiber optic vault security system, wherein the cage includes fiber optic panels on the front and sides only, and where cage is further protected by a secure wall, floor and ceiling.
Figure 12C:
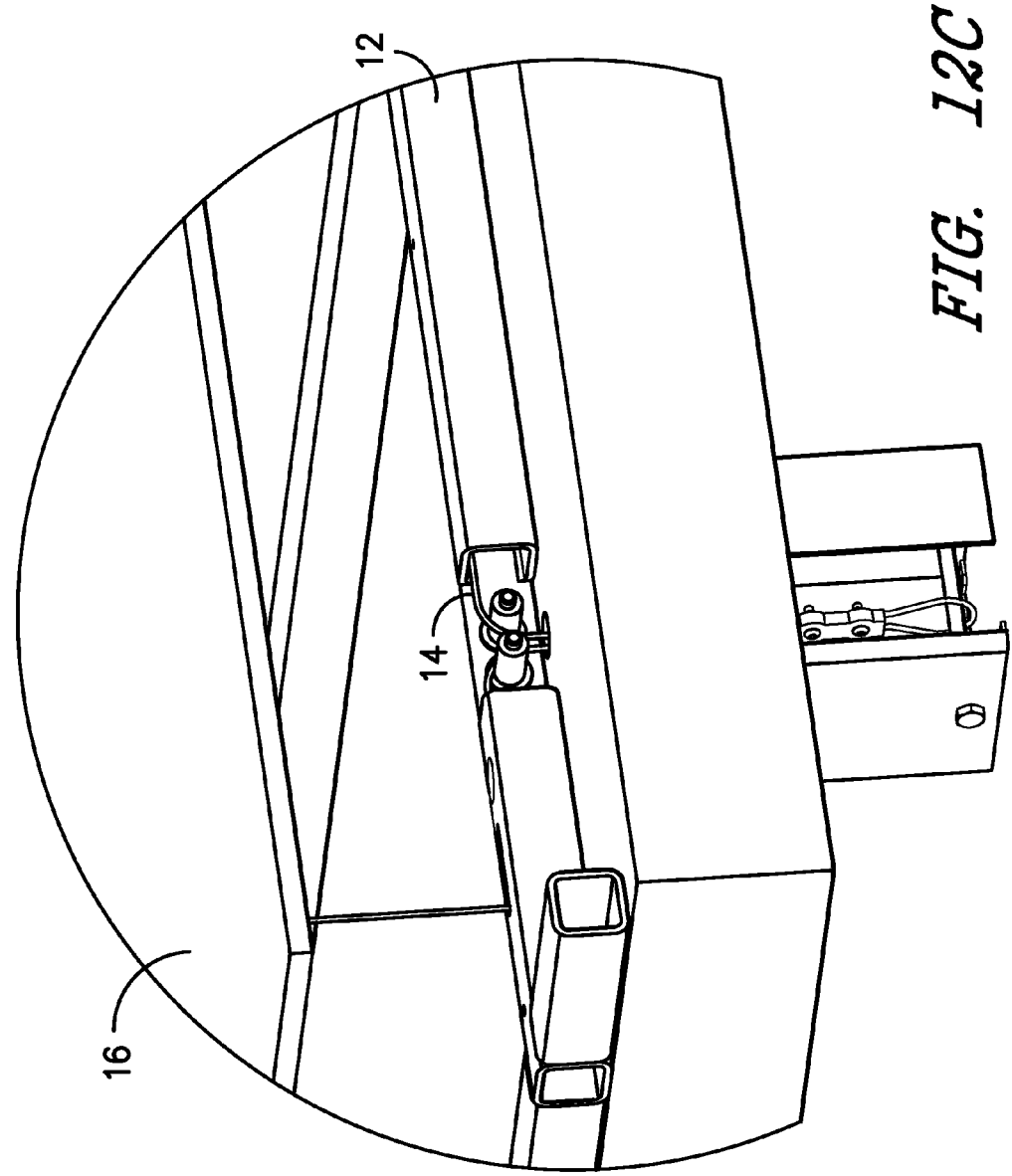
FIG. 12C is a top perspective view of the embodiment shown in FIGS. 12A and 12B, and further including one embodiment of a loop anchor assembly, taken from the inset portion of FIG. 12B.

In an alternative embodiment, a partial cage may be mounted to a secure wall, floor and ceiling, in an arrangement shown in FIGS. 12A-12C. In this embodiment, a three-sided frame may be constructed so that the panels may be attached to a front portion, side portions, and a door, as shown. This arrangement is designed similarly to other embodiments discussed herein, but the light panels are only necessary on the three sides that are not protected by a secure wall, floor or ceiling. The panels are preferably attached and the wires routed in the same manner as discussed hereinbelow, where provisions are made to reduce or eliminate any slack in the fiber optic lines, so that the removal of any panel after installation requires cutting the fiber optic line, which triggers an alarm.

Light Security System

Figure 6A:
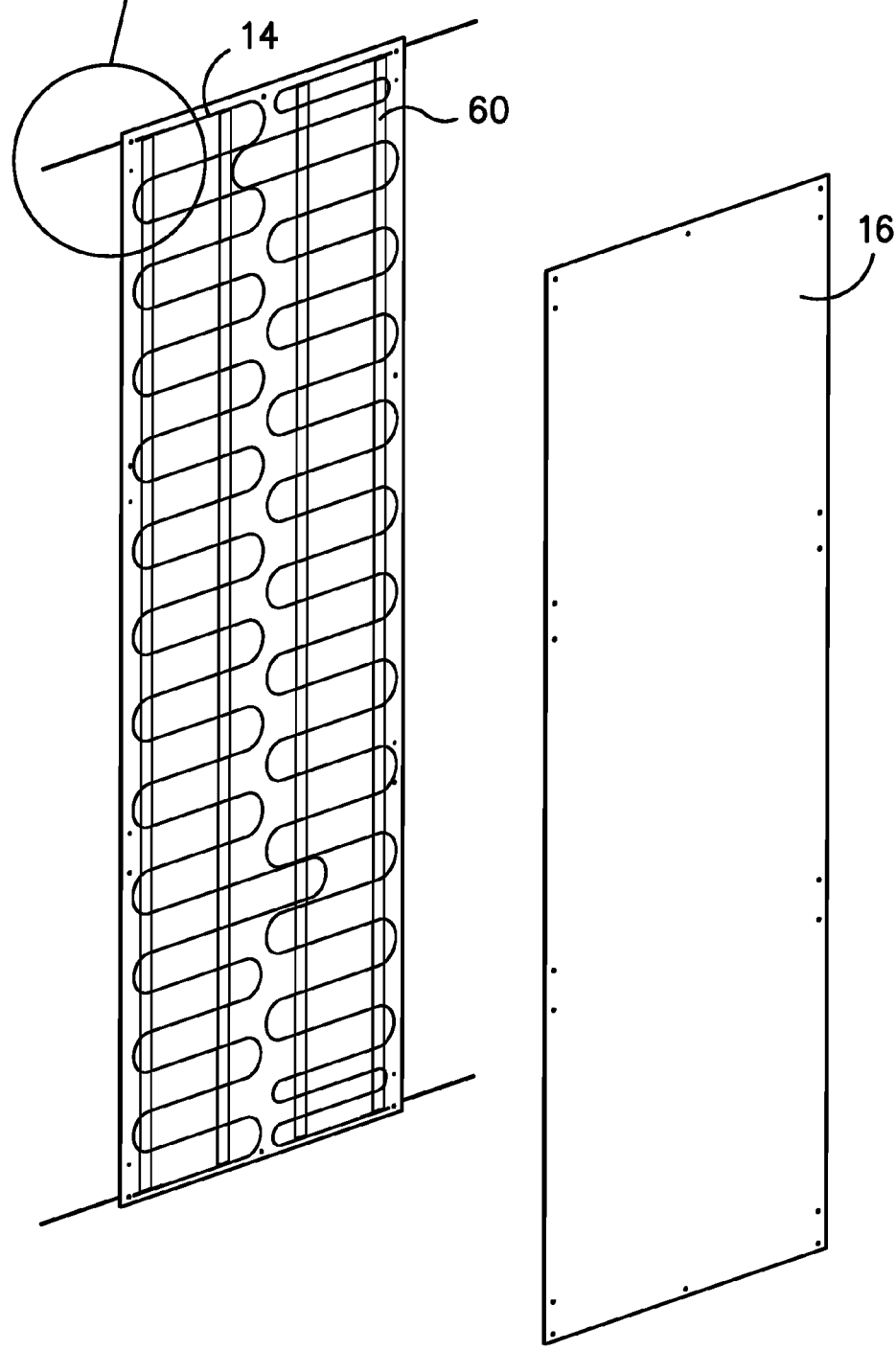
FIG. 6A is a perspective, exploded view of one embodiment of a laminated fiber panel construction with fiber exit points at the four corners of the panel.
Figure 6B:
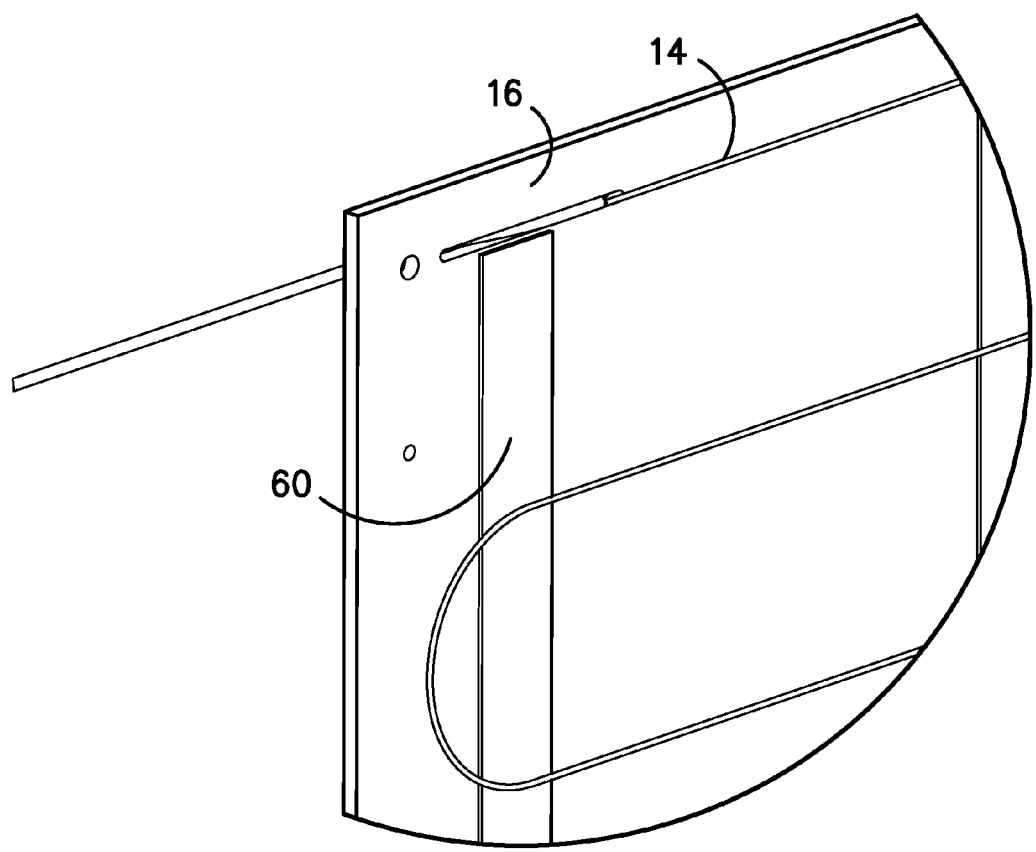
FIG. 6B is a perspective view of a portion of a laminated fiber panel construction, taken from the inset portion of FIG. 6A.

A series of panels 16 may be attached to the outer surfaces of the frames 12, preferably on the outside of the expanded metal portions 38 if those are used, and each panel 16 is embedded with or attached to fiber optic line 14 that extends throughout the inside portion of the panel, either in a sinusoidal pattern, randomly, or in some other desired configuration. Ideally, the fiber optic cable 14 pattern or configuration should ensure that the fiber optic lines 14 are close enough together to prevent someone from cutting a hole in the panel 16 that is large enough to remove the protected asset, or any portion of it, as shown in FIGS. 6A and 6B. In a preferred embodiment, each panel 16 is made from a laminated polycarbonate sheet containing fine-diameter fiber optic cable 14, although other suitable materials may be used, if desired.

In one preferred embodiment, a panel 16 comprises an inner polycarbonate layer and an outer polycarbonate layer, having lengths of fiber optic cables 16 embedded therebetween in a generally sinusoidal pattern, as shown in FIG. 6. The panel 16 may be assembled by affixing a series of parallel longitudinally oriented high bond acrylic adhesive strips 60 to an inner layer of polycarbonate, and then attaching the fiber optic line 14 in any desired shape or pattern. It should be noted, however, that in a preferred embodiment, the fiber optic line 14 pattern includes a nesting feature, as shown in FIG. 6, wherein two fiber optic lines 14 are embedded within the panel 16, and in some areas of the panel 16, the first fiber optic line 14 extends into an area (a trough) within a wave pattern of the second fiber optic line 14, and conversely, the second fiber optic line 14 extends within a trough of the wave pattern in the first fiber optic line 14. This arrangement prevents someone from simply making a cut in a vertical line down the middle of the panel between the two fiber optic lines in order to gain undetected access into the vault. Then, an outer layer of polycarbonate may be attached on top of the fiber optic line 14 and secured thereto by the acrylic strips 60. Additionally, screws may be inserted through the inner and outer layers of polycarbonate to secure the panel 16 together. Preferably, the fiber optic line 14 embedded within the panel is of finer gauge (for example, 250 micron fiber) than the fiber optic line 14 on the outside of the panel (for instance, 2 mm fiber tails).

At each of the four corners of each panel 16, a hole or slot is defined where the fiber optic line 14 may extend outwardly on the inner layer thereof. In order to install the panels 16 to the frame 12, the fiber optic lines 14 extending from the corners of a panel 16 are fed through corresponding holes in the frame 12 and into the hollow portion within the frame 12. The fiber optic lines 14 may then be pulled taut as the panel 16 is positioned in its desired location on the frame 12. When the panel 16 is in its proper position, and the fiber optic lines 14 are pulled taut, then the panel 16 may be screwed or otherwise secured to the frame 12 by any suitable means.

Each of the fiber lines 14 extending from the panels 16 is routed through the cage frame 12 and ultimately into a centralized control box 20. Inside the control box 20, all of the fiber lines 14 are physically anchored with minimum slack in the routing. This arrangement prevents the removal of any particular panel 16, as the fiber optic line 14 extending from that panel 16 back to the centralized control box 20 would necessarily have to be cut in order to remove any panel 16, and such action would trigger the alarm system. Ultimately, the panels 16 cover the entire outer portions of the cage 24, including the door 22, effectively creating a fiber optic shell about an outer portion thereof.

Figure 9A:
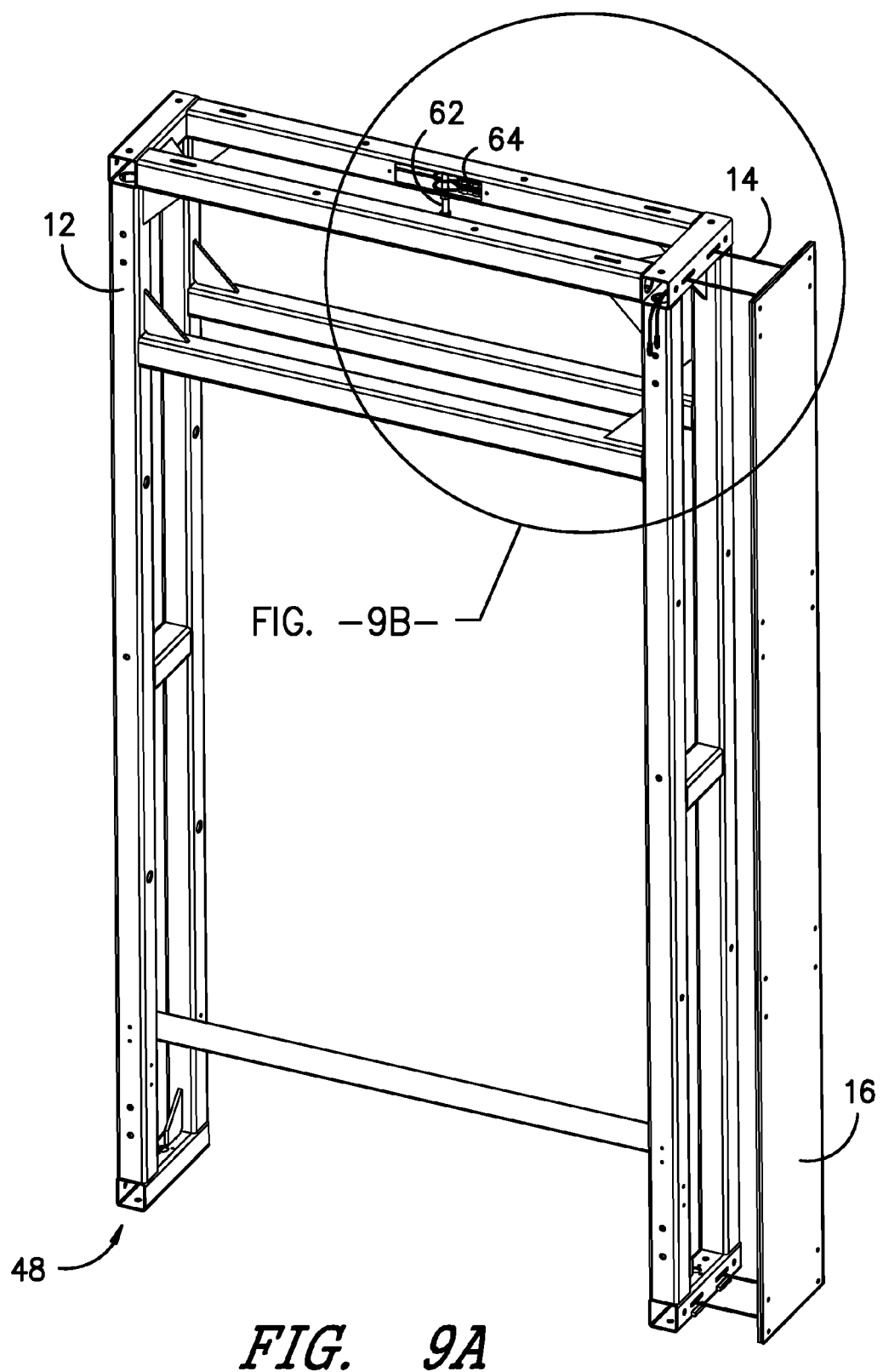
FIG. 9A is a perspective exploded view illustrating the connection between a panel and a frame of an extension member.
Figure 9B:
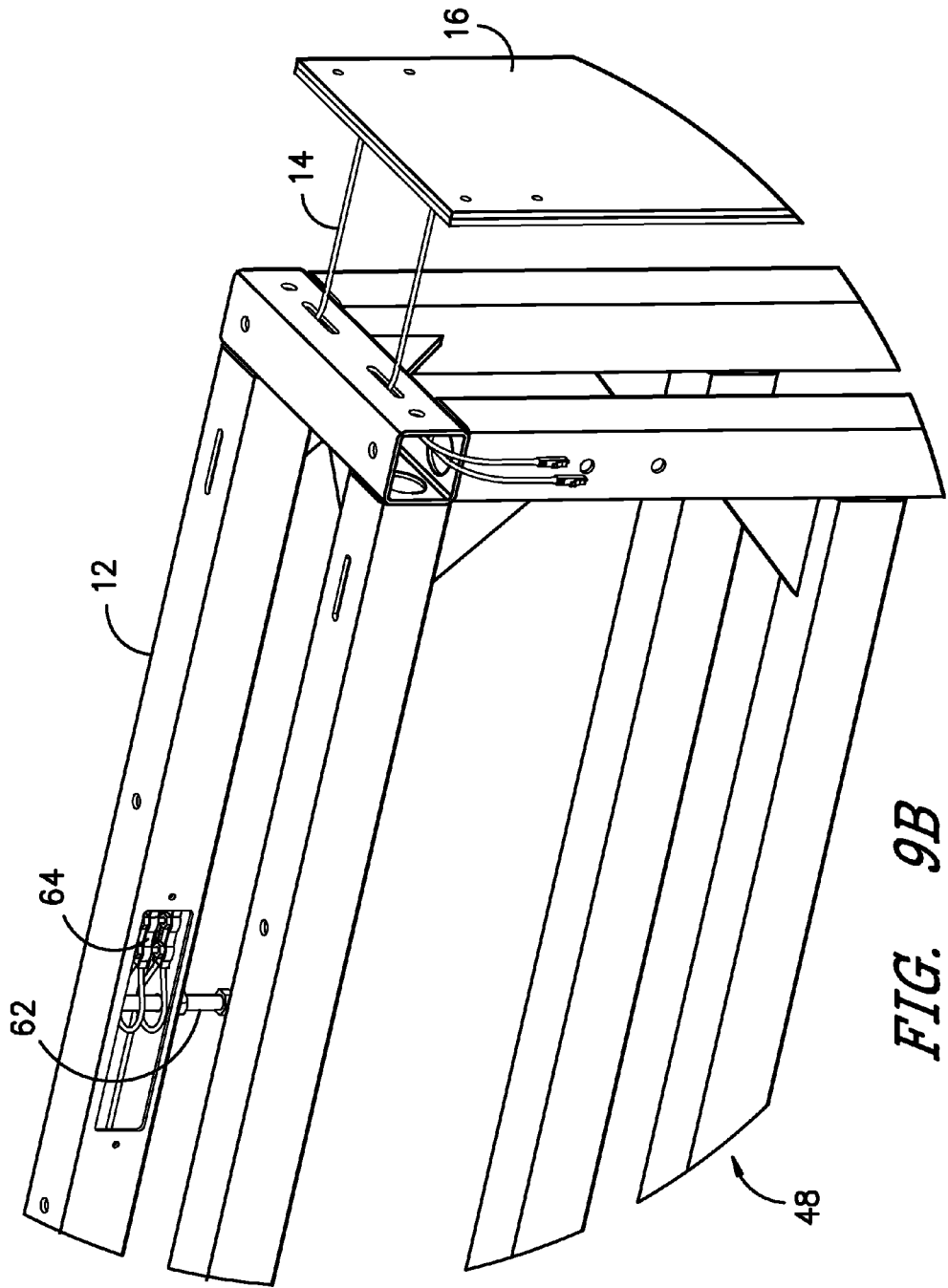
FIG. 9B is a perspective, exploded view illustrating the connection between a panel and a frame of an extension member, taken from the inset portion of FIG. 9A.

The panels 16 attach to the frame 12 of the extension member similarly to the manner in which the panels are attached to the primary cage member 24, but the fiber optic lines 14 run through the frame 12 in a different manner. Because of the modular nature of this embodiment, it is preferred that the routing of the fiber optic lines 14 within the extension member 48 be completed before delivery of the modular vault to the desired site. The panels 16 are affixed to the frame 12 of the extension member 48, and the fiber optic lines 14 are fed into the hollow frame member 12. FIG. 9 shows an embodiment wherein the fiber optic lines 14 are fed through the frame 12 to a top transverse frame member 12. A cable loop anchor bolt 62 extends upwardly through the top transverse frame member 12, and the fiber optic lines 14 from a panel 16 on a first side of the extension member 48 are fed to the cable loop anchor bolt 62, around the bolt 62, and back toward the first side, as shown in FIGS. 12A-12C. These fiber optic lines 14 are then fed through the adjacent top longitudinal member 12 to and through the front of the top longitudinal member 12 for connection to fiber optic cables 14 from the primary cage member 24. Panels on the second side of the extension member 48 include fiber optic lines 14 routed similarly, only in reverse. The cable loop anchor bolt 62 serves to allow the fiber optic lines 14 to be pulled taut during installation of the panels 16, so that there is little or no slack available in the fiber optic lines 14 for unauthorized removal of the panels 16. A cable loop clamp 64 is affixed to the fiber optic line 14 adjacent the loop in order to secure the loop in a desired location along the fiber optic line 14, and a sheath fits over the fiber optic line 14 where it comes into contact with the cable loop anchor bolt 62. During installation, the cable loop anchor bolt 62 is positioned away from the opposed wall of the frame member 12 to allow room to place the fiber optic cable loops therearound, and once they are in place, the anchor bolt 62 is tightened into place to secure the fiber optic loops in place, so that the cable loop anchor bolt 62 spans the width of the hollow channel within the transverse frame member 12.

Panels 16 with embedded fiber optic cables 14 may also be affixed to the outer side of the door 22 on the vault 24. The fiber optic cables 14 for the door 22 extend from the control box 20, through the hollow frame members 12 to a hole defined on a door frame member 46 near or adjacent to one or two door hinges.

A fiber hinge 66, as shown in FIG. 4, includes a spring based mechanism that maintains tension on the fiber optic cables 14 that pass outwardly from the fixed door frame 46 and into the frame of the door 22, so that they can be operatively connected to the panels 16 affixed to the door 22. The fiber hinge 66 is used to prevent the fiber optic cable 14 from becoming crimped or bent into an unacceptable acute angle during operation of the door 22. In one embodiment, the fiber hinge 66 includes a pivoting arm 68 that is pivotally attached to the fixed frame 12 of the vault 24 adjacent the floor, for instance. A pivot pin 70 is inserted and secured through the hollow frame member 12, and the pivoting arm 68 is rotatably attached to the pivot pin 70. On a lower portion of the pivoting arm 68, below the pivot pin 70, a spring 72 is attached. The spring 72 extends in the direction of the door frame 46, as shown, and is attached to a fixed pin 74 that is positioned within the fixed frame 12 of the vault 24. The pivoting arm 68 defines a hole at the approximate mid-point thereof, for receiving a fiber optic cable 14. The cable 14 extends from the fixed frame 12 of the vault 24, upwardly through the hole in the pivoting arm 68, back over a top portion of the pivoting arm 68, through a hole in the fixed door frame 46, and into the frame of the door 22, ultimately being operatively connected to fiber optic lines 14 in the door panel(s) 16. This arrangement maintains a consistent fiber path length and bend radius as the fiber 14 passes from a fixed cage frame 12 into a movable door 22. A rubber or plastic bushing 76 surrounds the hole in the door frame 46 through which the fiber optic cables 14 extend towards the door 22. The fiber optic cables 14 are bundled together within a flexible sheath, which helps to prevent the fiber optic cables 14 from becoming crimped or otherwise disturbed (bent in an unacceptably acute angle, which would interrupt the light signal streaming therethrough) during the opening or closing motion of the door 22.

In a preferred embodiment, the fiber optic cable 14 is configured in series, so that if one were to follow a single photon of light throughout the fiber optic matrix or system, one could trace that proton throughout the entire panel system of fiber optic lines 14, much like a single blood cell may circulate through a person's body.

Cage Alarm System

The cage 24 and its components may be protected against unauthorized access by various electronic means, including the fiber optic system, motion sensors, infrared sensors and/or infrared cameras, door sensors and/or magnetic switches, tamper switches and/or cameras, in any desired combination or configuration, either inside the vault or outside the vault, or both. Cameras may be mounted on the inside of the vault, as well as outside, for viewing the vault. The cameras (as well as other sensors) may be operatively connected to, or form a part of, the cage alarm system, so that in the event of an alarm, visual verification of an alarm event may occur. The cameras may also be connected to remote monitors, recording devices, or both. The cage alarm system may trigger a local alarm (such as a horn sounding or lights flashing), as well as a remote or electronic alarm that alerts security forces to a potential breach.

Control Box

Figure 2B:
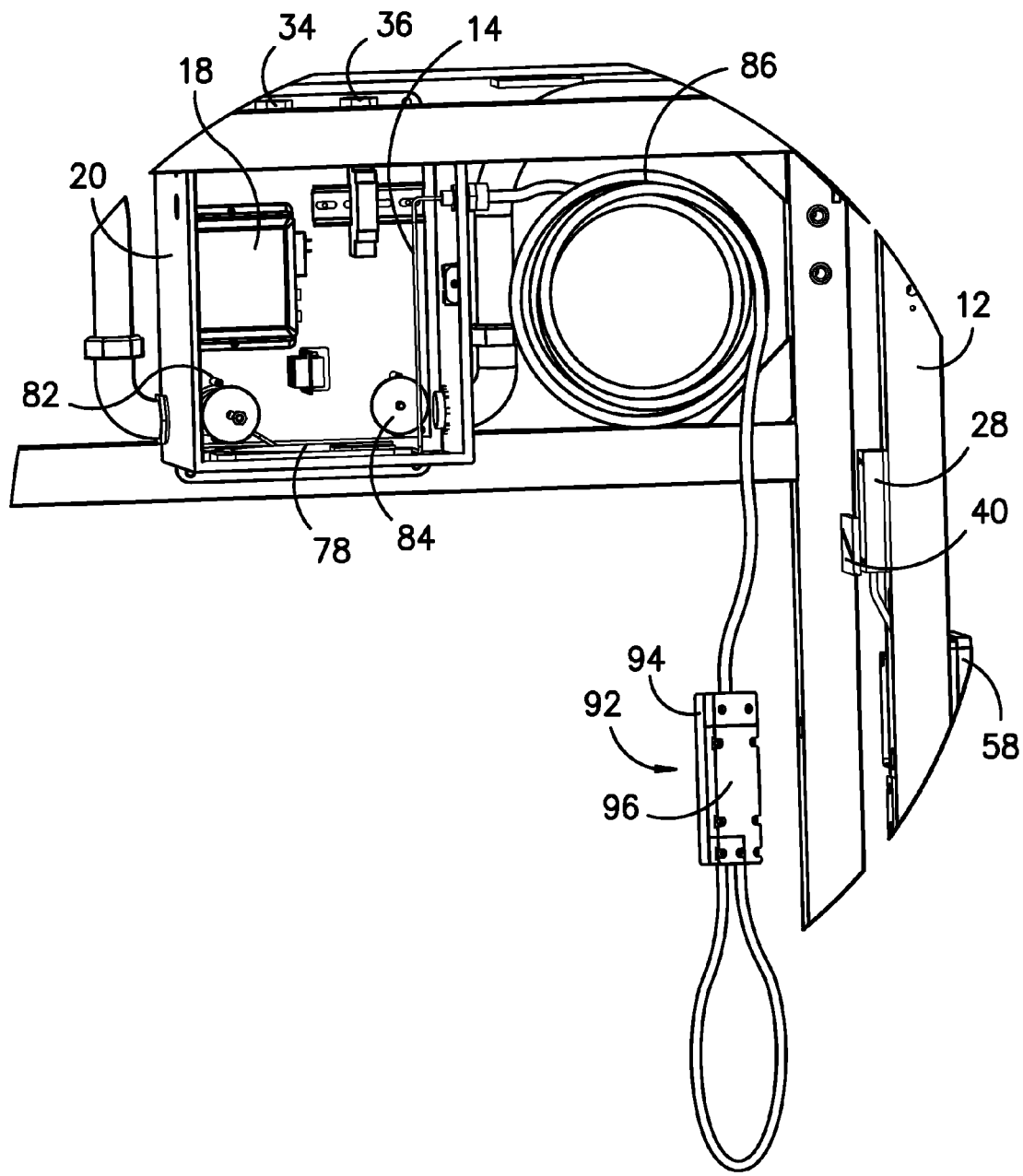
FIG. 2B is a detailed view of one embodiment of a tether assembly, as taken from the inset portion of FIG. 2A.
Figure 8:
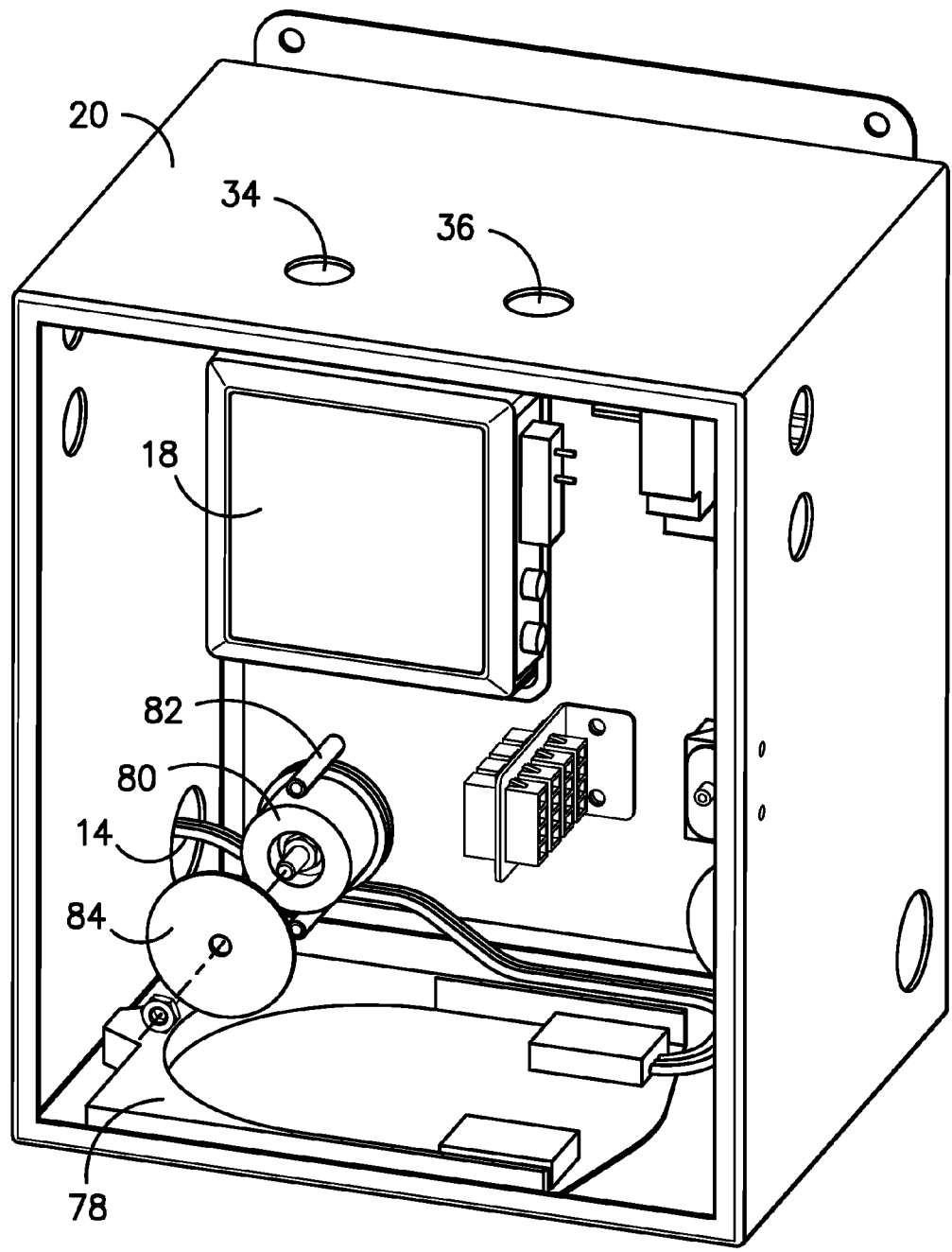
FIG. 8 is a perspective view of one embodiment of a control box including a splicing tray, fiber connectors, a fiber optic processor, a tamper switch for preventing unauthorized access to the box, a power supply, and an exploded view of a fiber optic line anchoring mechanism.

The fiber optic lines 14 are fed into a control box 20, which is preferably mounted to a ceiling portion of the vault 24 on the inside thereof. The control box 20 includes a splice tray 78, wherein the fiber optic cables 14 are spliced together, preferably in series (although it is certainly possible to configure the fiber optic cables 14 in parallel for each panel 16, for instance, if desired), as shown in FIGS. 2B and 8. The control box 20 may also include the light processor (fiber optic processor) 18, which transmits light from one port and circulates the light throughout the fiber optic system, and is then received back into the light processor 18. Thus, any disruption of the light anywhere along the fiber optic matrix or circuit may be detected by the light processor 18 (which is operatively connected to an alarm system), triggering an alarm. The fiber optic lines 14 are also embedded in the panel 16 affixed to the door 22 of the vault 24.

A pair of portals (34 and 36) is defined through the ceiling/roof of the vault, providing access to the control box 20. Power can enter the vault through portal 34, while alarm and control signals can exit the vault through portal 36. It is contemplated that there may be enough slack maintained in the cables that are connected to these portals so that the vault may be moved and repositioned within the room where it is situated for maintenance or other purposes without having to unhook or disconnect those lines.

The control box 20 may include a pair of fixed capstans 80 around which fiber optic cables may be wound, so that when the panels 16 are being installed onto the outside of the frame 12, the capstans 80 serve to secure the fiber optic lines 14 in the proper position. The capstans 80 serve as fiber optic anchors to ensure that the fiber optic lines 14 are locked or secured into a desired position to maintain the tension therein, as necessary. In one preferred embodiment as shown in FIG. 8, the control box 20 defines a hole through which fiber optic lines 14 enter the control box 20. Adjacent this entry hole is a fixed rubber capstan 80 affixed to a wall of the control box 20. A bundle of fiber optic lines 14 may be fed around the capstan 80 one time and held into place by a pair of fiber containment pins 82 that are placed about the periphery of the rubber capstan 80, having enough distance therebetween to feed the fiber optic lines 14. After the fiber optic lines 14 have been placed onto the capstan 80 between the fiber containment pins 82 and the undesired slack has been taken out of the fiber optic lines 14, a fender washer 84 may be placed and secured against the distal end of the rubber capstan 80 opposite the control box 20 wall, the fender washer 84 butting against the fiber containment pins 82 to hold the fiber optic lines 14 in place, as shown.

The control box 20 may also include a splicing tray 78, where the fiber optic cables 14 are spliced into a series or parallel circuit. Additionally, the control box 20 may further include the light processor 18, as well as any other components that may be incorporated into the system.

Tether

Some assets are mobile, and may need to be removed from the vault 24 for use. In such cases, an integrated fiber optic tether cable 86 may be secured to the asset and operatively connected to the control box 20. The fiber optic tether cable 86 includes a flexible outer sheath made of a strong material, such as steel, surrounding a fiber optic cable 14 that is attached to the control box 20 and the light processor 18 on one end and the protected asset on the other end, as shown in FIGS. 2A, 2B, 10A and 10B. The tether 86 can be attached to the asset in any desired secure manner, and if the light traveling through the tether's fiber optic cables 14 is interrupted or disturbed in any way, then an alarm is triggered. Thus, in order to remove the asset from the tether 86, the tether must be cut, disconnected from the control box 20 and the light processor 18, or disconnected from the asset. In any of these cases, an alarm is triggered.

Figure 3A:
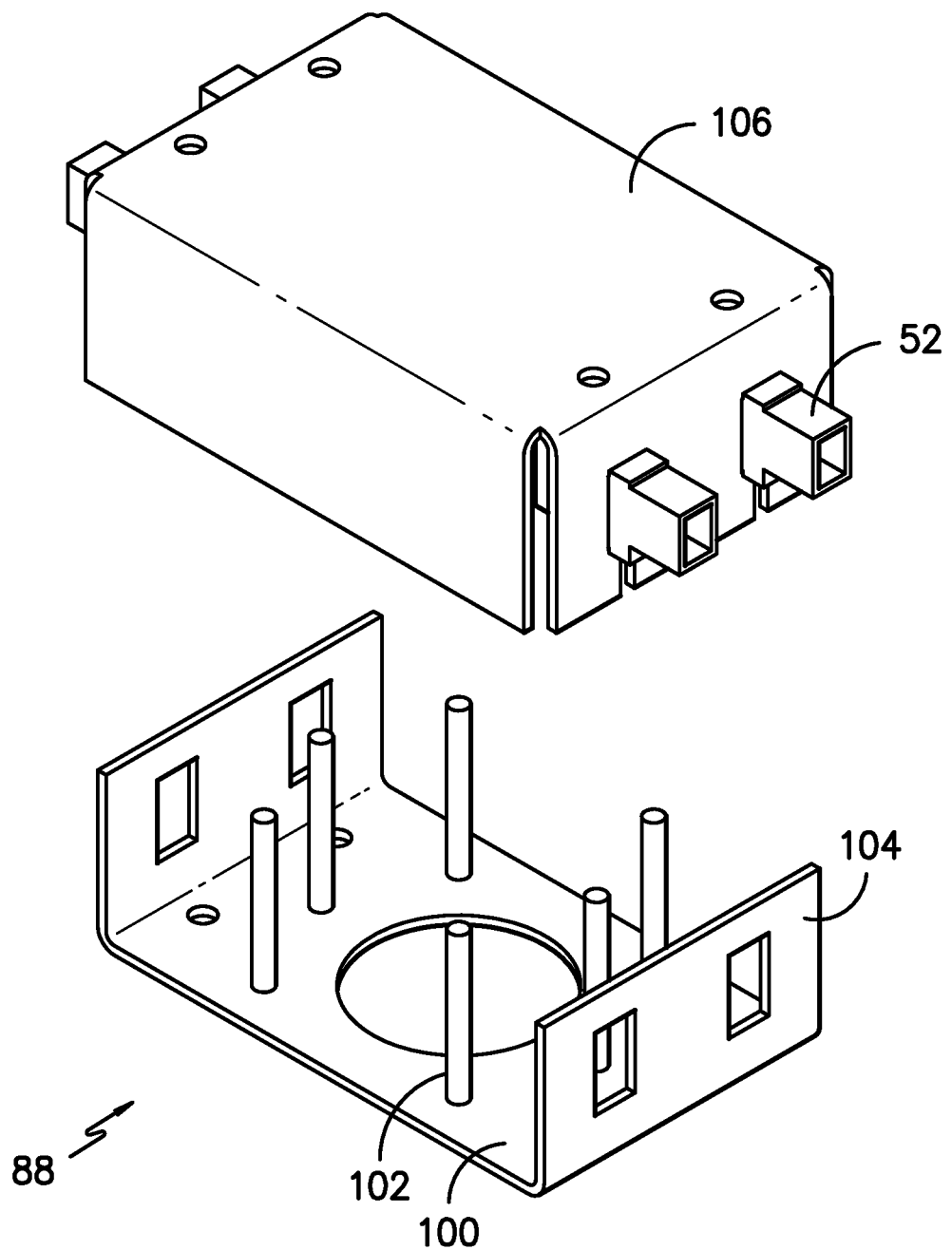
FIG. 3A is a perspective, exploded view of one embodiment of a tether system anchor block to prevent unauthorized removal of an attached asset.
Figure 3B:
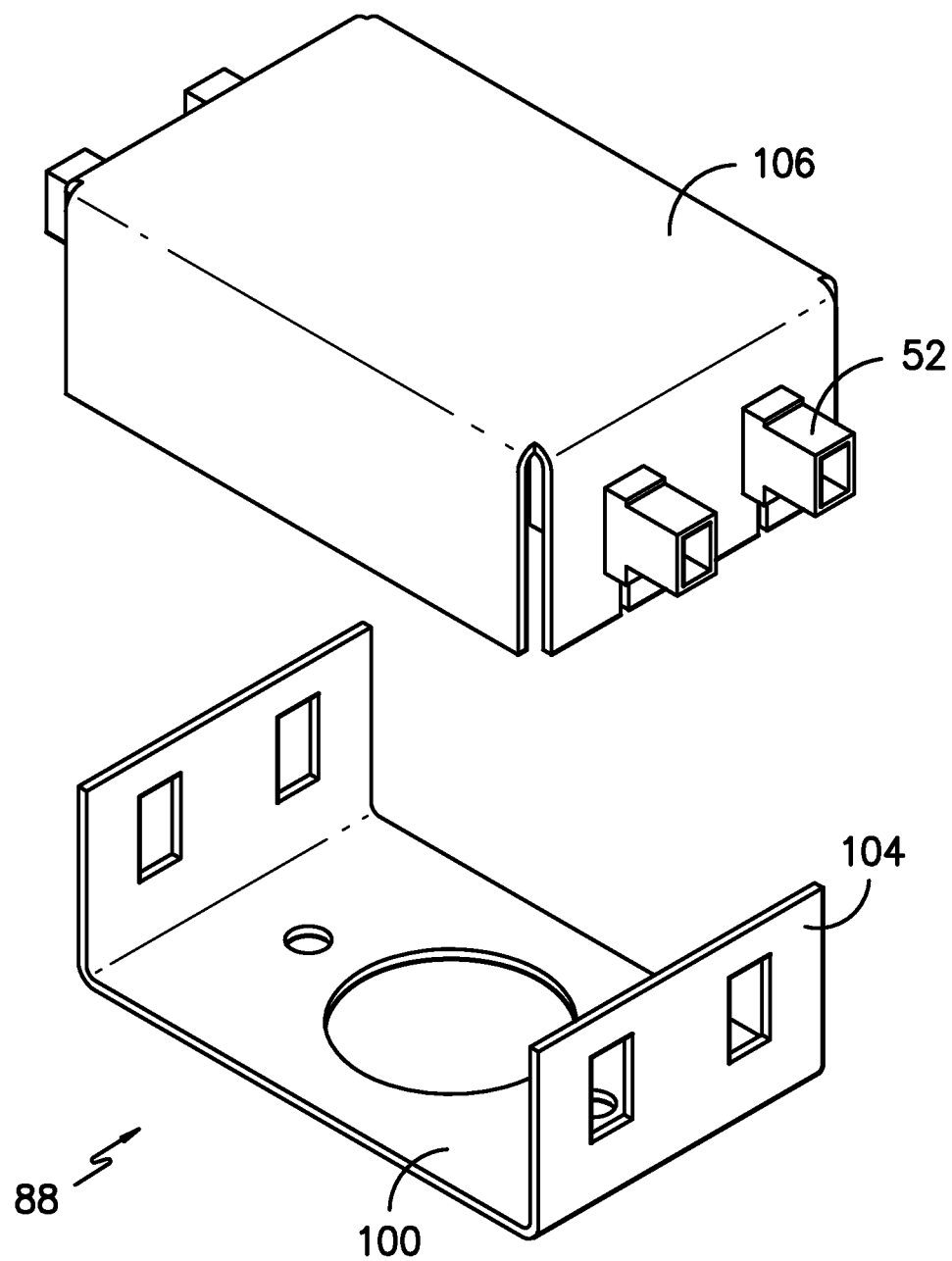
FIG. 3B is a perspective, exploded view of another embodiment of a tether anchor block to prevent unauthorized removal of an attached asset.

Special consideration should be given to the manner in which the tether 86 is attached to the asset. One option is to pass a loop of the tether cable 86 around an area of small girth on the asset such that it cannot be removed because of the physical features of the asset. Another option is to pass a loop of the tether cable 86 through an opening in the asset, such as a hole or a gap between the asset body and a securely welded protrusion. A third option is to use a tether cable anchor block 88 that is permanently bonded to the asset, such as with high-strength epoxy, as shown in FIGS. 3A and 3B. In this option, a fine-diameter fiber 14 inside the tether anchor block 88 is separately bonded to the asset and protected from access by the bonded block itself. If the anchor block 88 is forcefully removed, the fiber 14 breaks, and a subsequent alarm is triggered.

Figure 10A:
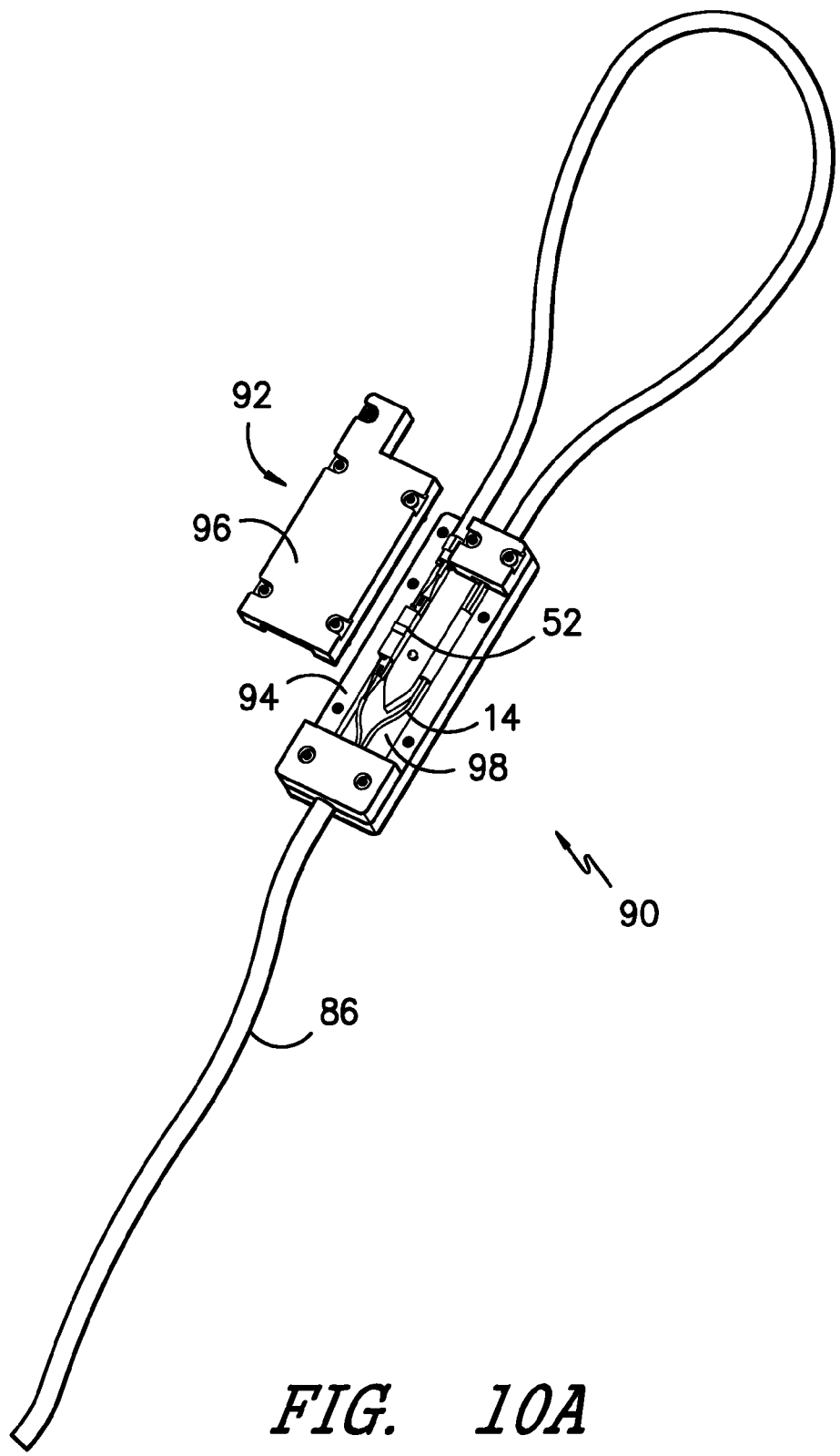
FIG. 10A is a perspective view of a tether clamp block, used in conjunction with a loop at the end of a fiber optic tether, wherein the tether clamp block includes a mechanism for disengaging the loop from itself as shown, threading it through some portion of a protected asset, and then reconnecting the loop back together.
Figure 10B:
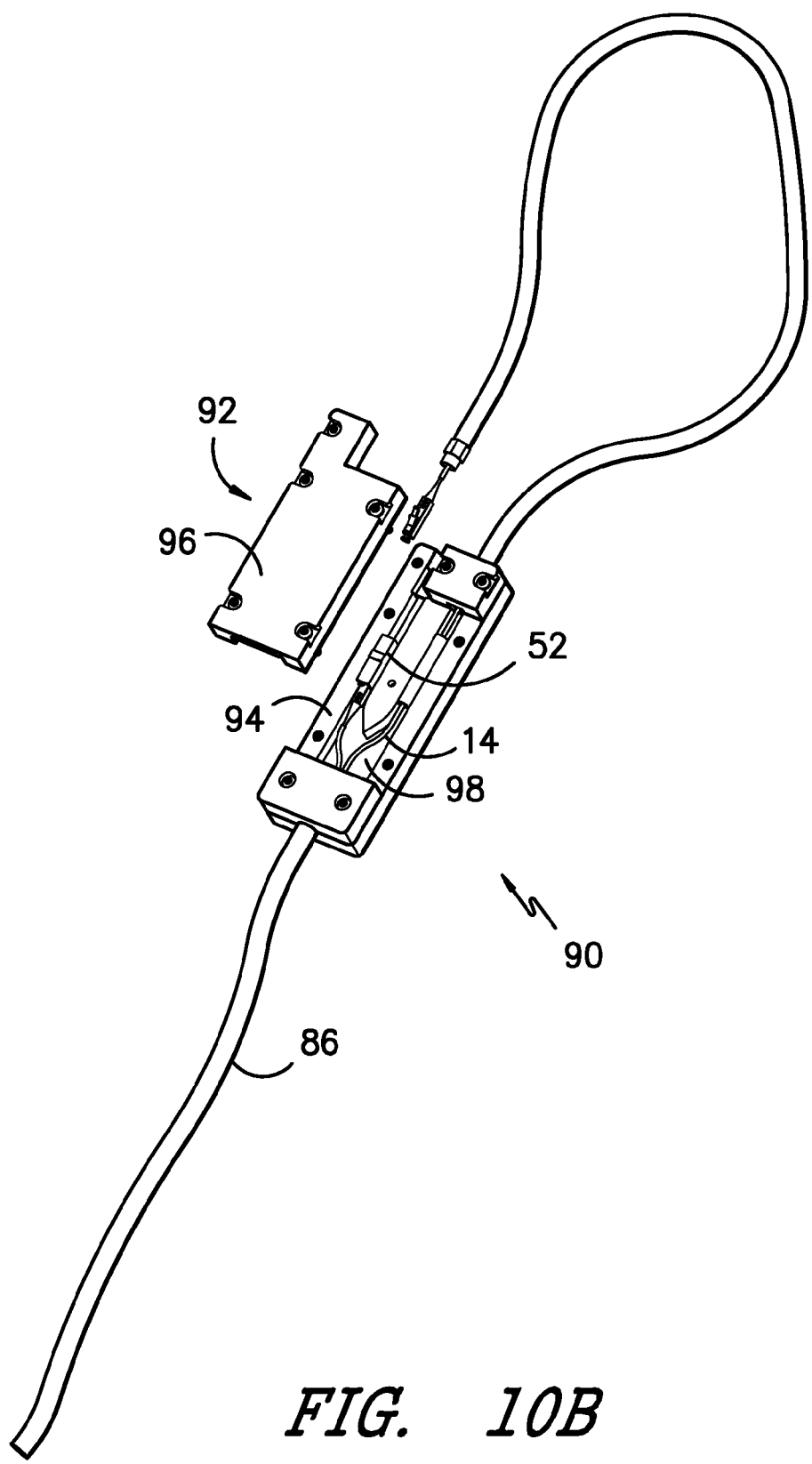
FIG. 10B is a perspective view of a tether clamp block, used in conjunction with a loop at the end of a fiber optic tether, wherein the tether clamp block mechanism is shown in the disengaged, disconnected position.

In one embodiment, the fiber optic cable 14 is operatively connected to a light processor 18 in a control box 20 at one end, and includes a detachable loop mechanism 90 at the other end. Essentially, the light processor 18 sends a light signal from a light transmission port toward along the tether 86, around the loop, back along the tether 86 and back into the receiving port. The detachable loop mechanism 90, in a preferred embodiment, includes a tether clamp block 92 at the base of the loop, as shown in FIG. 10. The tether clamp block 92 includes a housing 94 with a removable cover 96 and a pair of channels 98 or tracks in a Y shape. The fiber optic line 14 extends along one channel 98 of the fork of the Y and out of the tether clamp block 92, begins the loop, and then circles back into channel 98 of the second fork of the Y. Within the channel 98 of the second fork of the Y in the tether clamp block 92 is a fiber optic connection 52 having a squeeze tab, as shown in FIGS. 10A and 10B. In use, the removable cover 96 may be removed, and the fiber optic connection 52 may be disconnected, so that the fiber optic cable 14 may be run through some fixed portion of a protected asset, and then the fiber optic connection 52 may be reconnected, so that the loop encircles some portion of the protected asset. Then, the fiber optic cable 14 may be replaced into the proper channels 98, and the cover 96 may be replaced on the housing 94. Once the tether 86 is activated, an alarm is triggered if either the tether 86 is disconnected from the control box 20, or if the tether 86 is cut, or if the fiber optic connection 52 is disconnected within the tether clamp block 92.

In one embodiment, as shown in FIG. 2, the tether assembly may include a dedicated control box 20, similar to an electrical enclosure, which houses a fiber optic processor 18 that may include dry contacts for the alarm system (normally closed or normally open). Power is supplied to the control box, and specifically to the fiber optic processor (light processor) 18, from a suitable power source, which may include 12-24 VDC or 120 VAC. The tether 86 includes an armored cable extending from the control box 20 at one end, and formed into a loop at an opposed end by using a tether clamp block 92, as shown. The control box 20 may include a tamper switch in order to detect attempts at unauthorized access into the control box 20.

In another embodiment, a tether 86 may be directly attached to a protected asset, so that the tether loop includes contact members that are mounted on the asset using a strong adhesive, epoxy, mechanical hardware, or the like. The tether loop may include anchor blocks 88 spaced at intervals around the loop, and the anchor blocks 88 include a base member 100 with a series of fiber wrap pins 102 extending outwardly therefrom, as shown in FIG. 3. The base member 100 includes a pair of side members 104, each defining a pair of holes for receiving fiber optic cables 14. A top cover member 106 fits onto the base member 100, and includes four side members, wherein two of the side members 104 define holes corresponding to the holes in the sides of the base member 100 to receive the fiber optic cables 14. Fiber adapter/connectors 52 are affixed to the outer portion of the top cover holes for connecting external fiber optic lines 14 to the fiber optic lines 14 inside of the anchor block 88.

These fiber connectors 52 are inserted into the corresponding holes in both the base member 100 and the top cover 106 after the two pieces are assembled with their holes aligned. The fiber connectors 52 serve as the securing hardware to prevent the top cover 106 from being removed in an unauthorized manner. Optionally, 4 small holes can be used in the top cover 106 in line with the release tabs on the fiber optic connectors 52 so that a pin could be inserted through these openings to release the fiber connectors 52 and remove the top cover 106. This option might be used in locations requiring less security and more serviceability of the tether system. Alternatively, the 4 release pin holes could be positioned in the base member 100 instead of the top cover 106. In this embodiment, the fiber connectors 52 would be rotated 180 degrees so that their release tabs faced the base member floor. In this configuration, the anchor block 88 would have to be forcibly removed from its mount in order to gain access to the internal components within the anchor block 88.

The base member 100 defines a large hole in the central portion thereof. The internal fiber optic cables 14 may be wound about the fiber wrap pins 102 in a pattern or a random manner, and adhesive or epoxy may be used to attach the internal fiber optic cables 14 to the protected asset through the central hole in the base member 100. Once the top cover 106 is secured in place and the internal fiber optic cables 14 are attached to the asset and operationally connected to the rest of the tether 86, any attempts to remove the anchor block 88 necessarily causes a break in the internal fiber optic cables 14, thereby triggering an alarm.

In yet another embodiment, particularly in a vault embodiment where the vault is mobile, on wheels for instance, the tether 86 may extend from the vault 24 to a floor or wall and an anchor block 88 (or multiple anchor blocks) may be mounted thereto using an adhesive, epoxy or other bonding agent or mechanical hardware. The opposed end of the tether 86 may be connected directly to the control box 20, or may be integrated into the fiber optic system surrounding the vault. Either way, the tether 86 is ultimately operatively connected to the light processor 18 within the control box 20.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What we claim is:

1. A fiber optic security vault comprising:
    a frame comprising a series of connected, hollow support members, said frame forming a three-dimensional enclosure, and said frame including a door on a front side thereof;
    a series of panels attached to said frame on an outer portion thereof, and at least one panel attached to an outer face of said door, wherein each said panel includes at least one fiber optic cable embedded therein;
    a splicing tray positioned within said vault, said splicing tray adapted to receive a plurality of fiber optic cables, and wherein said fiber optic cables are spliced together to form at least one circuit;
    said fiber optic cables being operatively connected to a light processor for transmitting and receiving light signals; and
    said light processor being capable of detecting disturbances in said light signal, and said light processor being operatively connected to an alarm system, so that if said light processor detects a disturbance in said light signal, said light processor sends a signal to trigger said alarm system.

2. The fiber optic security vault set forth in claim 1, wherein said fiber optic cables of each panel are operatively connected together in series, forming a single fiber optic circuit about said vault.

3. The fiber optic security vault set forth in claim 1, wherein sections of expanded metal are attached to inner portions of said frame members, forming inner walls of said vault.

4. The fiber optic security vault set forth in claim 1, further including sections of spaced bars attached to inner portions of said frame members to provide an additional physical barrier against access to said vault.

5. The fiber optic security vault set forth in claim 1, further including anchoring means for securing said vault to said floor, wherein said anchoring means are attached to said frame on a bottom portion thereof, on an inside of said vault, and wherein said anchoring means are further secured to a floor beneath said vault.

6. The fiber optic security vault set forth in claim 1, further including a magnetic switch apparatus affixed to said door and said frame adjacent said door for monitoring whether said door is in an open or a closed position.

7. The fiber optic security vault set forth in claim 1, wherein portions of said fiber optic cable extend through said hollow frame members.

8. The fiber optic security vault set forth in claim 1, wherein said fiber optic cables are oriented within each said panel so that ends of said fiber optic cable extend outwardly from each corner of said panel on a rear side thereof, and wherein each end of said fiber optic cable is operatively connected to fiber optic cables that extend through said hollow frame members and are operatively connected to a control box.

9. The fiber optic security vault set forth in claim 1, further including at least one camera affixed to an inside portion of said vault, said camera providing a video feed to a component selected from the group consisting of a video monitor and a recording device, or both.

10. The fiber optic security vault set forth in claim 1, further including a fiber hinge mechanism comprising:
    a pivot pin secured within said frame member;
    a spring loaded pivoting arm attached to said pivot pin and extending upwardly from said frame member and adjacent a fixed door frame having a hole passing therethrough, said pivoting arm defining a hole in a front portion thereof;
    a length of fiber optic cable extending outwardly from said frame member, through said hole in said pivoting arm, over a top portion of said pivoting arm, through said hole in said fixed door frame and into a frame of said door;
    wherein said pivoting arm is spring biased in a direction away from said door, so that when said door is closed, said pivoting arm moves away from said door and said fixed door frame, and when said door is open, said pivoting arm moves in a direction toward said fixed door frame and said door, in order to prevent said fiber optic cable from becoming crimped or bent into an unacceptably acute angle during operation of said door.

11. The fiber optic security vault set forth in claim 1, further including a fiber optic tether that is operatively connected to a control box on one end thereof, and may be connected to a protected asset within said vault on an opposed end thereof.

12. The fiber optic security vault set forth in claim 1, further including an authorized access reader attached to an outer portion of said vault or to a remote location and operatively connected to an electric strike.

13. The fiber optic security vault set forth in claim 12, wherein said access reader is adapted to read multiple factors in order to provide access to said vault.

14. The fiber optic security vault set forth in claim 6, wherein said magnetic switch includes a sensor and a target, and wherein a fiber optic loop extends about said target, said fiber optic loop being operatively connected to said light processor.

15. The fiber optic security vault set forth in claim 1, further including a fiber optic tether operatively connected to said light processor.

16. The fiber optic security vault set forth in claim 15, wherein said tether includes a detachable loop on a distal end.

17. The fiber optic security vault set forth in claim 16, wherein said loop includes an anchor block operatively connected thereto.

18. The fiber optic security vault set forth in claim 16, further including a tether clamp block comprising:
   a housing with a removable cover;
   at least one channel disposed within said housing for receiving fiber optic cable; and
   wherein said fiber optic cable positioned within said channel includes a fiber optic connection that may be unconnected and reconnected.

19. The fiber optic security vault set forth in claim 17, wherein said anchor block is adhesively or mechanically connected to a floor or wall.

* * * * *